US012561096B2

(12) United States Patent
Singh et al.

(10) Patent No.: US 12,561,096 B2
(45) Date of Patent: Feb. 24, 2026

(54) DISCOVERY CONTROLLER WITH FEATURE DISCOVERY FOR DATA STORAGE DEVICES

(71) Applicant: Western Digital Technologies, Inc., San Jose, CA (US)

(72) Inventors: Rakesh Singh, Bangalore (IN); Swarup Kulkarni, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/623,321

(22) Filed: Apr. 1, 2024

(65) Prior Publication Data

US 2025/0306800 A1     Oct. 2, 2025

(51) Int. Cl.
*G06F 3/06* (2006.01)

(52) U.S. Cl.
CPC .......... *G06F 3/0659* (2013.01); *G06F 3/0604* (2013.01); *G06F 3/0683* (2013.01)

(58) Field of Classification Search
CPC ..... G06F 3/0659; G06F 3/0604; G06F 3/0683
See application file for complete search history.

(56) References Cited

U.S. PATENT DOCUMENTS

| | | | |
|---|---|---|---|
| 7,711,677 B1 * | 5/2010 | Nandi | G06F 9/4411 |
| | | | 707/999.003 |
| 10,296,258 B1 | 5/2019 | Richardson | |
| 2007/0180168 A1 * | 8/2007 | Chikusa | G06F 3/0664 |
| | | | 710/74 |
| 2012/0151355 A1 * | 6/2012 | Butt | H04L 41/5058 |
| | | | 715/736 |
| 2016/0080475 A1 * | 3/2016 | Singh | H04L 67/51 |
| | | | 709/217 |
| 2018/0270119 A1 | 9/2018 | Ballapuram | |
| 2018/0285019 A1 * | 10/2018 | Olarig | G06F 3/0604 |
| 2019/0065412 A1 * | 2/2019 | Qiu | G06F 3/0635 |
| 2023/0014556 A1 * | 1/2023 | Schuler | G06F 16/137 |
| 2024/0419347 A1 * | 12/2024 | Achkinazi | G06F 3/0659 |

* cited by examiner

*Primary Examiner* — Ryan Bertram
(74) *Attorney, Agent, or Firm* — Patent Law Works LLP

(57) ABSTRACT

Systems and methods for a discovery controller configured with feature discovery for exposed data storage devices. The discovery controller may receive a discovery command from a host system that includes a token value, where the token values map to different storage device configurations among the exposed storage devices. The discovery controller compares the received token value to device token values for each of the storage devices to select the storage devices with matching token values. The discovery controller then generates a discovery log that includes device entries for only those devices with the matching token values and sends it to the host system for selecting storage devices to connect to.

20 Claims, 9 Drawing Sheets

700

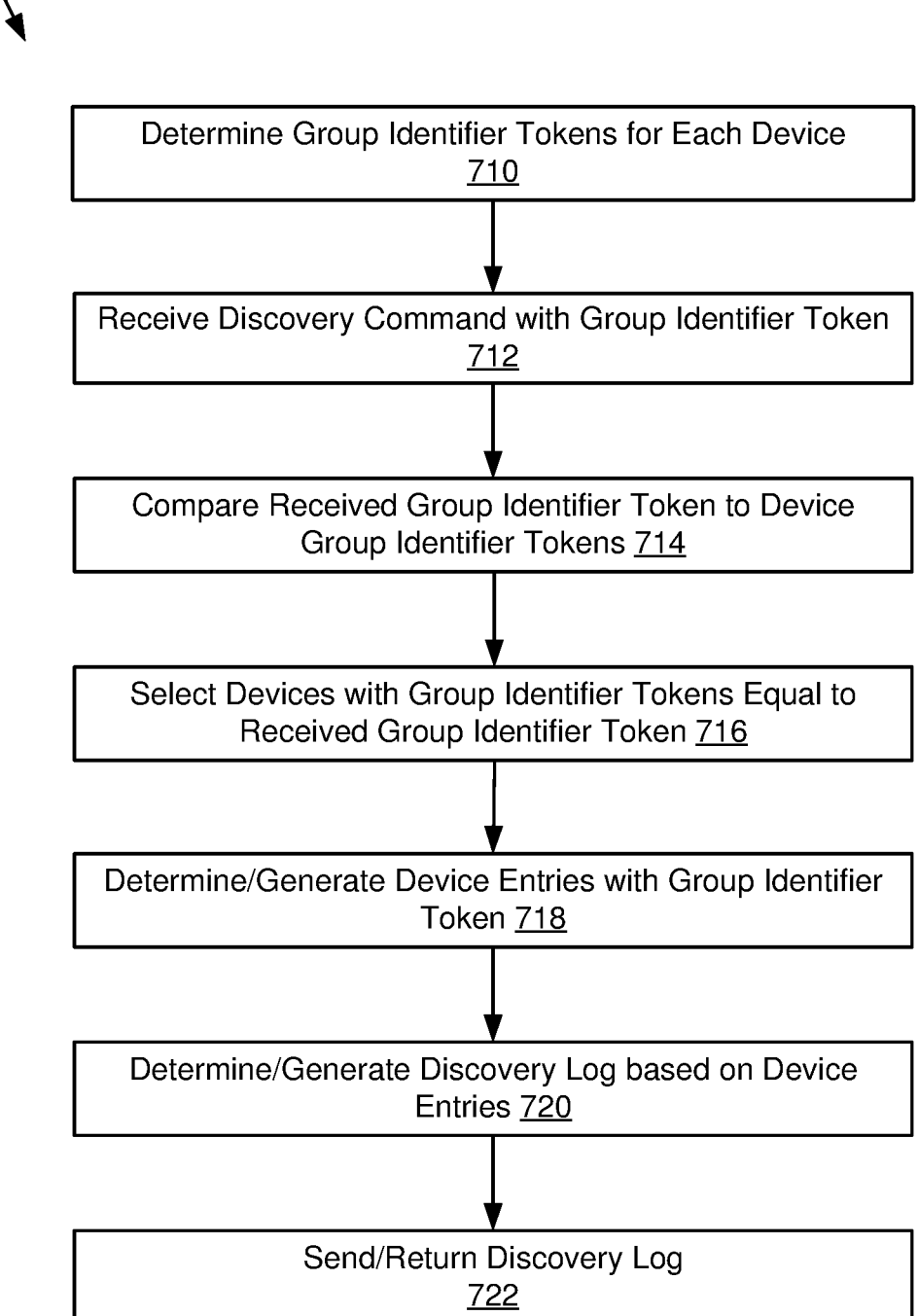

Determine Group Identifier Tokens for Each Device
710

Receive Discovery Command with Group Identifier Token
712

Compare Received Group Identifier Token to Device
Group Identifier Tokens 714

Select Devices with Group Identifier Tokens Equal to
Received Group Identifier Token 716

Determine/Generate Device Entries with Group Identifier
Token 718

Determine/Generate Discovery Log based on Device
Entries 720

Send/Return Discovery Log
722

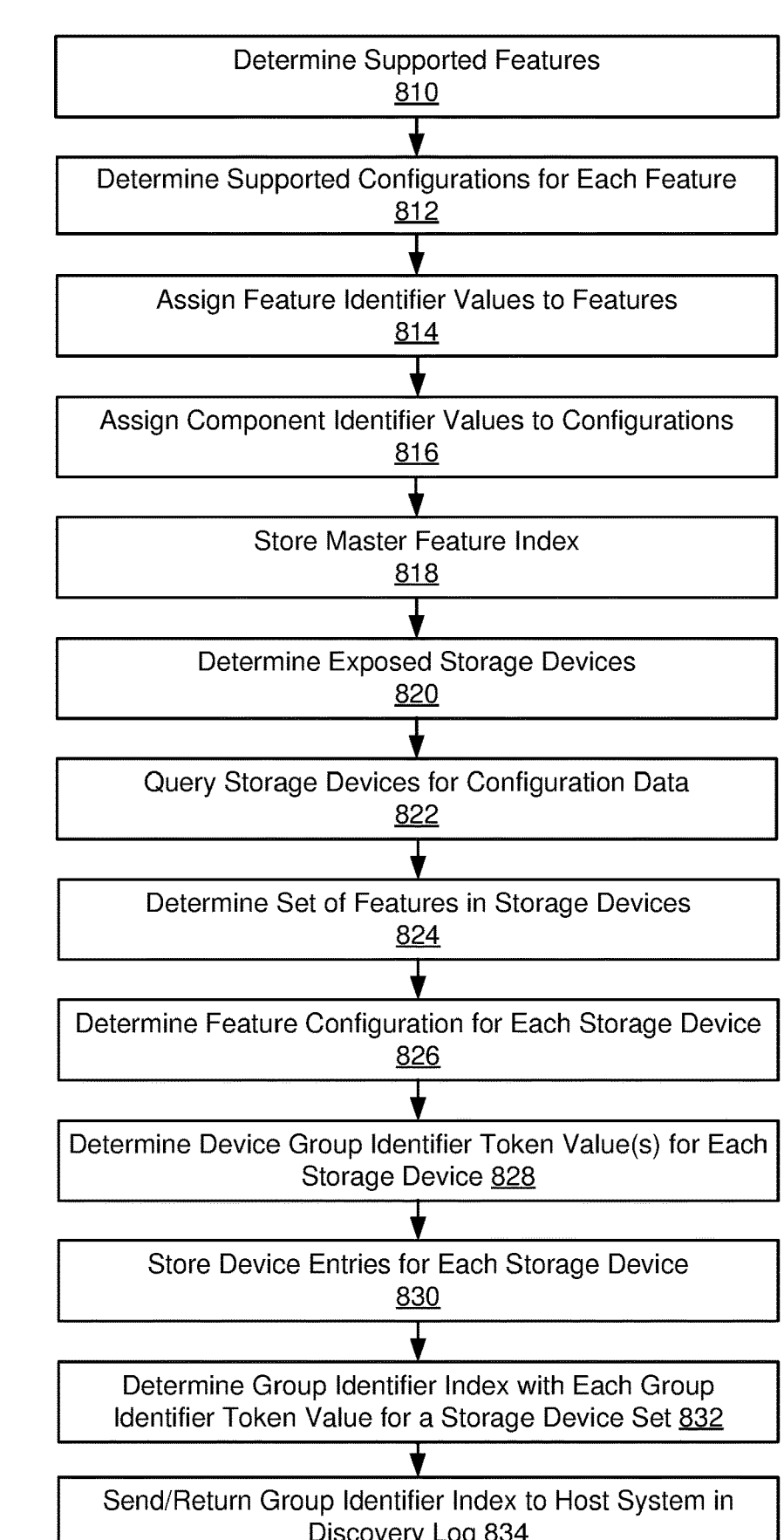

Determine Supported Features
810

Determine Supported Configurations for Each Feature
812

Assign Feature Identifier Values to Features
814

Assign Component Identifier Values to Configurations
816

Store Master Feature Index
818

Determine Exposed Storage Devices
820

Query Storage Devices for Configuration Data
822

Determine Set of Features in Storage Devices
824

Determine Feature Configuration for Each Storage Device
826

Determine Device Group Identifier Token Value(s) for Each Storage Device 828

Store Device Entries for Each Storage Device
830

Determine Group Identifier Index with Each Group Identifier Token Value for a Storage Device Set 832

Send/Return Group Identifier Index to Host System in Discovery Log 834

Figure 8

Discovery Log 900

| Discovery Log Page 910 |
| --- |
| Generation Counter 912 |
| Number of Records 914 |
| Discovery Log Entry 916.1 |
| Discovery Log Entry 916.2 |

⋮

| Discovery Log Entry 916.n |
| --- |

| Discovery Log Entry 916 |
| --- |
| Subsystem Type 920 |
| Transport Requirements 922 |
| Port Identifier 924 |
| Controller Identifier 926 |
| Maximum Queue Size 928 |
| Transport Service Identifier 930 |
| Subsystem Name 932 |
| Subsystem Address 934 |
| Subsystem Address Type 936 |
| Group Identifier 938 |

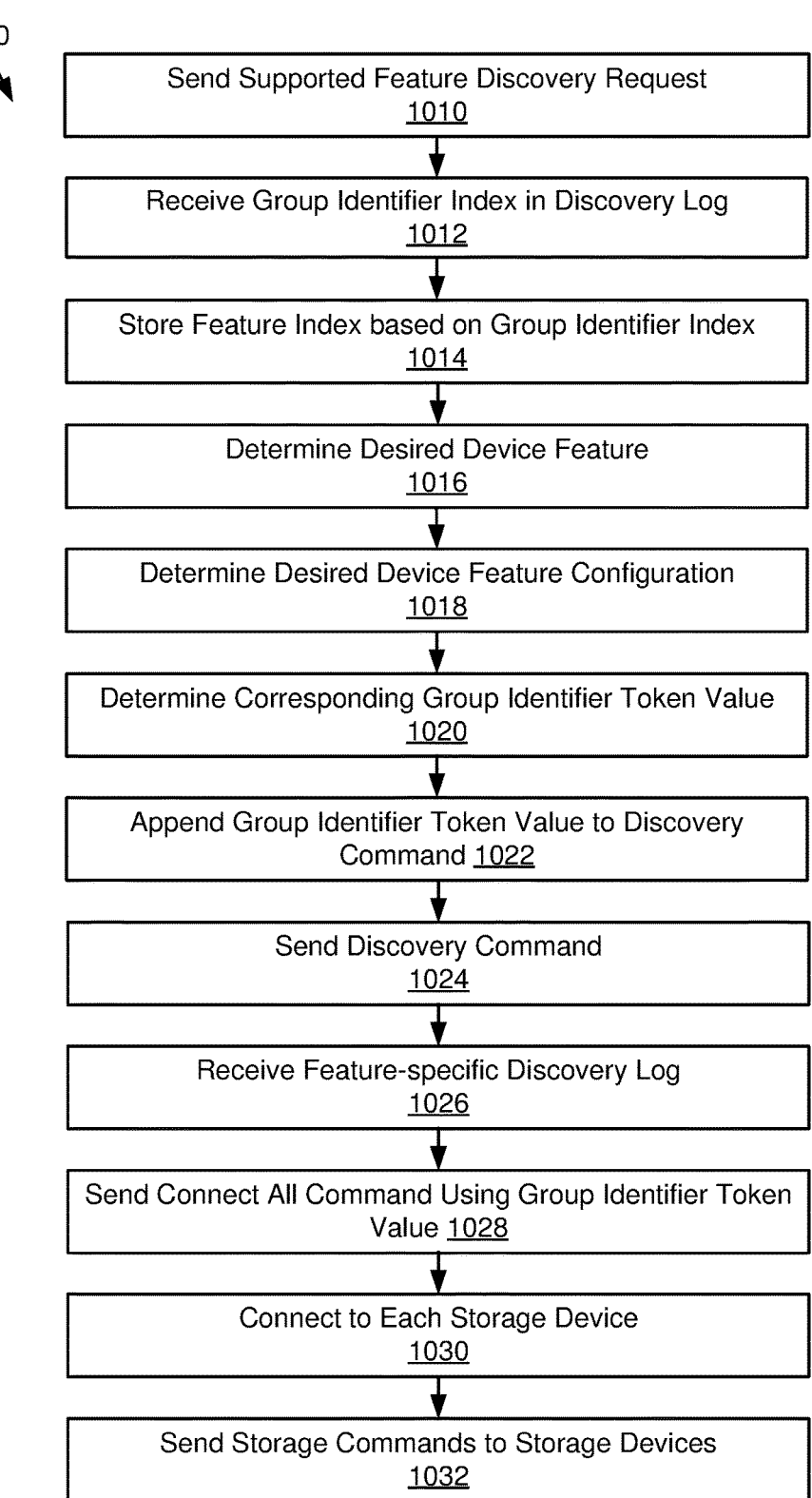

Send Supported Feature Discovery Request
1010

Receive Group Identifier Index in Discovery Log
1012

Store Feature Index based on Group Identifier Index
1014

Determine Desired Device Feature
1016

Determine Desired Device Feature Configuration
1018

Determine Corresponding Group Identifier Token Value
1020

Append Group Identifier Token Value to Discovery Command 1022

Send Discovery Command
1024

Receive Feature-specific Discovery Log
1026

Send Connect All Command Using Group Identifier Token Value 1028

Connect to Each Storage Device
1030

Send Storage Commands to Storage Devices
1032

Figure 10

DISCOVERY CONTROLLER WITH FEATURE DISCOVERY FOR DATA STORAGE DEVICES

TECHNICAL FIELD

The present disclosure generally relates to distributed data storage systems and, more particularly, to discovery logs for host discovery of data storage devices.

BACKGROUND

Networked storage systems are integral components of modern data centers, providing centralized data storage solutions that can be accessed by multiple hosts over a network fabric. These systems typically include a multitude of data storage devices, such as hard disk drives (HDDs) or solid-state drives (SSDs), managed by a controller circuit to facilitate data storage and retrieval operations.

In such environments, the discovery and management of data storage devices are of paramount concern. Network storage systems may utilize discovery controllers that enable hosts to detect and connect to available storage devices. These discovery controllers operate in accordance with established protocols, such as the Non-Volatile Memory express (NVMe) over Fabrics (NVMeOF), which defines a mechanism for the discovery of NVMe devices in a fabric network.

The current state of technology involves the use of discovery log pages retrieved by hosts from discovery controllers, which provide information about the storage devices to the hosts. This information typically includes network addresses and other relevant details that allow hosts to establish communication with the storage devices using the NVMeOF protocol.

While existing discovery mechanisms provide a foundational approach to device detection and enumeration, they often require hosts to connect to each storage device individually to ascertain its features and configurations. This process can be time-consuming and inefficient, particularly in large-scale deployments with a high number of storage devices.

Furthermore, the dynamic nature of networked storage systems, where devices may frequently be added, removed, or reconfigured, poses additional challenges for efficient and accurate discovery and management. There is a continuing technological interest in improving the discovery and management processes to address the evolving demands of networked storage systems.

SUMMARY

Various aspects for discovery controllers for distributed storage systems that have feature discovery for exposed data storage devices, particularly using configuration tokens in discovery commands, are described.

One general aspect includes a system that includes a controller circuit including at least one memory and at least one processor configured to, alone or in combination, execute instructions in the at least one memory to: receive, from a host system, a discovery command, where the discovery command may include a token value; compare the received token value to a device token value for each data storage device of a plurality of data storage devices in communication with the controller circuit; select at least one data storage device that has the device token value that corresponds to the received token value; determine a discovery log may include at least one device entry corresponding to the selected at least one data storage device; and return, to the host system, the discovery log.

Implementations may include one or more of the following features. The received token value may include: a feature identifier value corresponding to a feature of the plurality of data storage devices; and a component identifier value corresponding to a selected configuration of the feature of the plurality of data storage devices. The received token value may further include a plurality of feature identifier values corresponding to a plurality of features of the plurality of data storage devices and a plurality of component identifier values corresponding to the plurality of feature identifier values. Each component identifier value of the plurality of component identifier values may correspond to a selected configuration of the feature corresponding to the corresponding feature identifier value and the received token value may correspond to a selected set of feature configurations for at least one data storage device in the plurality of data storage devices. The received token value may be a two byte value, a first byte of the two byte value may include the feature identifier value, and a second byte of the two byte value may include the component identifier value. The at least one processor may be further configured to, alone or in combination, execute instructions in the at least one memory to: query each data storage device of the plurality of data storage devices for configuration data corresponding to at least one feature for that data storage device; determine a set of features present in the plurality of data storage devices; determine, for each data storage device of the plurality of data storage devices and for each feature in the set of features, a corresponding configuration; and determine, based on at least one feature in the set of features and the corresponding configuration for that data storage device, at least one device token value for each data storage device of the plurality of data storage devices. The at least one processor may be further configured to, alone or in combination, execute instructions in the at least one memory to store, in a device configuration data structure in a non-volatile memory, configuration data for each combination of each data storage device of the plurality of data storage devices and each feature in the set of features. Determining the at least one device token value for each data storage device of the plurality of data storage devices may be based on the device configuration data structure. The at least one processor may be further configured to, alone or in combination, execute instructions in the at least one memory to: determine a plurality of data storage device sets from the plurality of data storage devices corresponding to different feature configurations; determine a group identifier value for each data storage device set; determine a group identifier index of the group identifier values and corresponding feature configurations; and return, to the host system, the group identifier index. The system may include the host system, configured for network communication with the controller circuit, including: at least one host memory; and at least one host processor configured to, alone or in combination, execute instructions in the at least one host memory to: determine a desired device feature configuration; determine the token value corresponding to the desired device feature configuration; append the token value to the discovery command; and send the discovery command to the controller circuit. The at least one device entry in the discovery log may include a plurality of device entries for a plurality of selected data storage devices, and the at least one host processor may be further configured to, alone or in combination, execute instructions in the at least one host memory to: receive, from the controller circuit, the discovery log; send, to the controller circuit, a connect all command may include the token value; and connect the host system to each data storage device of the plurality of selected data storage devices. The system may include an enclosure that includes: a network interface configured for connection to a network fabric; the plurality of data storage devices; and the controller circuit.

Another general aspect includes a computer-implemented method that includes: receiving, from a host system, a discovery command, where the discovery command may include a token value; comparing the received token value to a device token value for each data storage device of a plurality of data storage devices in communication with a target system; selecting at least one data storage device that has the device token value that corresponds to the received token value; determining a discovery log may include at least one device entry corresponding to the selected at least one data storage device; and returning, to the host system, the discovery log.

Implementations may include one or more of the following features. The received token value may include: a feature identifier value corresponding to a feature of the plurality of data storage devices; and a component identifier value corresponding to a selected configuration of the feature of the plurality of data storage devices. The received token value may further include a plurality of feature identifier values corresponding to a plurality of features of the plurality of data storage devices and a plurality of component identifier values corresponding to the plurality of feature identifier values. Each component identifier value of the plurality of component identifier values may correspond to a selected configuration of the feature corresponding to the corresponding feature identifier value; and the received token value may correspond to a selected set of feature configurations for at least one data storage device in the plurality of data storage devices. The received token value may be a two byte value; a first byte of the two byte value may include the feature identifier value; and a second byte of the two byte value may include the component identifier value. The computer-implemented method may include: querying each data storage device of the plurality of data storage devices for configuration data corresponding to at least one feature for that data storage device; determining a set of features present in the plurality of data storage devices; determining, for each data storage device of the plurality of data storage devices and for each feature in the set of features, a corresponding configuration; and determining, based on at least one feature in the set of features and the corresponding configuration for that data storage device, at least one device token value for each data storage device of the plurality of data storage devices. The computer-implemented method may include storing, in a device configuration data structure in a non-volatile memory, configuration data for each combination of each data storage device of the plurality of data storage devices and each feature in the set of features, where determining the at least one device token value for each data storage device of the plurality of data storage devices is based on the device configuration data structure. The computer-implemented method may include: determining a plurality of data storage device sets from the plurality of data storage devices corresponding to different feature configurations; determining a group identifier value for each data storage device set; determining a group identifier index of the group identifier values and corresponding feature configurations; and returning, to the host system, the group identifier index. The computer-implemented method may include: determining, by the host system, a desired device feature configuration; determining, by the host system, the token value corresponding to the desired device feature configuration; appending, by the host system, the token value to the discovery command; and sending, by the host system, the discovery command to the target system. The computer-implemented method may include: receiving, by the host system, the discovery log; sending, from the host system and to the target system for the plurality of data storage devices, a connect all command may include the token value; and connecting the host system to each data storage device of the plurality of data storage devices having the device token value matching the token value.

Still another general aspect includes a storage system that includes: a plurality of data storage device exposed to a host system over a network fabric; at least one memory; at least one processor; means for receiving, from the host system, a discovery command, where the discovery command may include a token value; means for comparing the received token value to a device token value for each data storage device of the plurality of data storage devices in communication with a target system; means for selecting at least one data storage device that has the device token value that corresponds to the received token value; means for determining a discovery log may include at least one device entry corresponding to the selected at least one data storage device; and means for returning, to the host system, the discovery log.

The various embodiments advantageously apply the teachings of distributed storage networks and/or systems to improve the functionality of such computer systems. The various embodiments include operations to overcome or at least reduce the issues previously encountered on the storage networks and/or systems and, accordingly, are more reliable and/or efficient than other computing networks. That is, the various embodiments disclosed herein include hardware and/or software with functionality to improve the management of subsystem discovery by host systems, such as by using configuration tokens in discovery commands to selectively discover and connect to subsets of the exposed data storage devices. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

BRIEF DESCRIPTION OF THE DRAWINGS

The accompanying figures illustrate various aspects of the disclosed storage system and methods for discovery controllers with feature discovery for data storage devices. The figures are schematic and are not necessarily to scale, with emphasis instead being placed upon illustrating the principles of the disclosure.

FIG. 7 is a flowchart of an example method for device discovery management, according to aspects of the present disclosure.

FIG. 8 is a flowchart of an example method for managing storage device features for discovery, according to aspects of the present disclosure.

FIG. 9 is a schematic of a discovery log structure within a storage system, according to aspects of the present disclosure.

FIG. 10 is a flowchart of an example method for discovering and managing storage device connections by a host system, according to aspects of the present disclosure.

DETAILED DESCRIPTION

Figure 1:
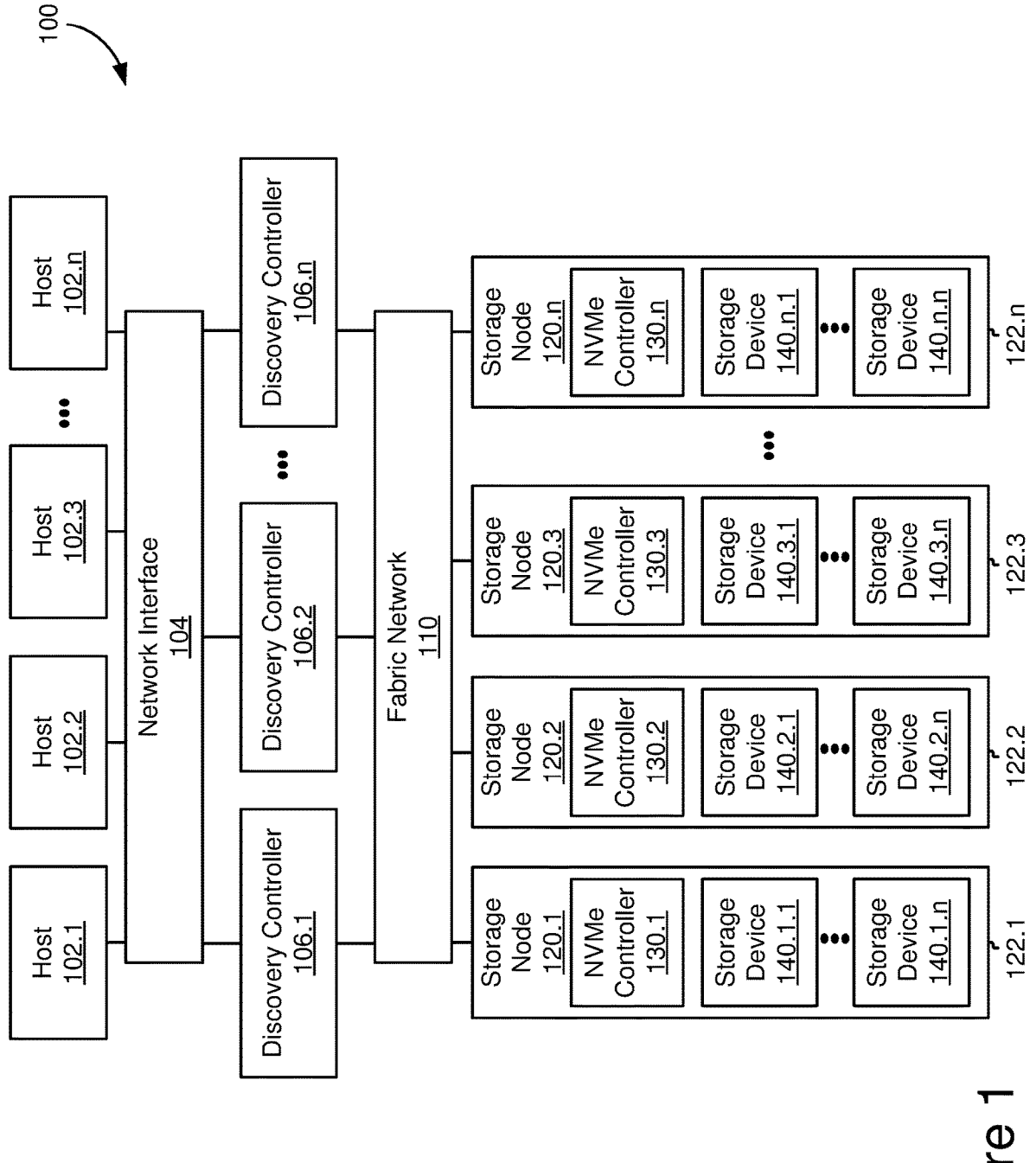
FIG. 1 is a schematic representation of a networked storage system, according to aspects of the present disclosure.

FIG. 1 shows an embodiment of an example data storage system 100 with fabric connected data storage devices 140. While some example features are illustrated, various other features have not been illustrated for the sake of brevity and so as not to obscure pertinent aspects of the example embodiments disclosed herein. To that end, as a non-limiting example, data storage system 100 includes one or more data storage devices 140 (also sometimes called information storage devices, storage devices, or disk drives) configured in storage nodes 120. In some embodiments, storage nodes 120 may be configured as blades, just-a-bunch-of-flash (JBOF) enclosures, or similar storage units for use in data center storage racks or chassis. Storage nodes 120 may be support the data storage and retrieval operations of host systems 102. In some embodiments, one or more discovery controllers 106 may be used by host systems 102 to determine available data storage devices among storage nodes 120 and storage devices 140, in order to selectively establish storage connections to target storage devices. Discovery controllers 106 may include standalone devices or be embedded in another system, such as NVMe controllers 130.1 in storage nodes 120, storage network interface cards, network switches, or other devices connected to fabric network 110 and accessible by hosts 102.

In the embodiment shown, each storage node 120 includes a number of storage devices 140 attached to a common fabric network 110. For example, storage devices 140 may include a number of disk drives arranged in a storage array, such as storage devices sharing a common rack, enclosure, or unit in a data center. In some embodiments, storage devices 140 may share a peripheral computer interface express (PCIe) switch, backplane network, base-board management controller, network switch(es), and/or other hardware and software components. For example, fabric network 110 may include a plurality of physical port connections to storage nodes 120, NVMe controllers 130, and storage devices 140 that define physical, transport, and other logical channels for establishing communication with the different components and subcomponents thereof and contribute to fabric network 110. Each storage node 120 may include a corresponding enclosure 122 in which the NVMe controller 130, data storage devices 140, and other components are mounted. For example, each storage node 120 may include an enclosure comprised of a chassis and hard shell in which one or more printed circuit board assemblies may be mounted for NVMe controllers 130, discovery controllers 106, PCIe switch, and other circuitry and defining a set of slots and corresponding interfaces for receiving storage devices 140 and at least one network interface port for connecting to fabric network 110.

Host systems 102.1-102.*n* may be any suitable computer device, such as a computer, a computer server, a laptop computer, a tablet device, a netbook, an internet kiosk, a personal digital assistant, a mobile phone, a smart phone, a gaming device, or any other computing device. Host system 102 is sometimes called a host, client, or client system. In some embodiments, host system 102 is a server system, such as a server system in a data center. In some embodiments, the one or more host systems 102 are one or more host devices distinct from discovery controllers 106, storage nodes 120, NVMe controllers 130, and the plurality of storage devices 140. The one or more host systems 112 may be configured to store and access data in the plurality of storage devices 140, such as by connecting to defined namespaces within those data storage devices for data storage operations that support applications running on or accessed through those host systems.

In some embodiments, the data storage devices 140 are, or include, solid-state drives (SSDs). Each data storage device 140.1.1-140.*n.n* may include a non-volatile memory (NVM) or device controller based on compute resources (processor and memory) and a plurality of NVM or media devices for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, data storage devices 140 may each be packaged in a housing, such as a multi-part sealed housing with a defined form factor and ports and/or connectors for interconnecting with fabric network 110.

In some embodiments, a respective data storage device 140 may include a single medium device while in other embodiments the respective data storage device 140 includes a plurality of media devices. In some embodiments, media devices include NAND-type flash memory or NOR-type flash memory. In some embodiments, data storage device 140 includes one or more hard disk drives (HDDs). In some embodiments, data storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, NVMe controllers 130 may be coupled to respective data storage devices 140 through an interface bus within each storage node 120. For example, each storage mode may be configured as a storage blade or similar storage unit comprising a plurality of interface slots for storage devices 140 and one or more corresponding switches, such as a PCIe switches for controlling communication to that set of storage devices. NVMe controllers 130 may include NVMe-oF interface cards with interface ports for NVMe-oF compatible storage devices, such as storage devices with NVMe interfaces and onboard remote direct memory access (RDMA) engines. In some embodiments, NVMe controllers 130 may be coupled to respective data storage devices 140 through a backplane network and/or fabric network 110. However, in some embodiments, NVMe controllers 130 may be hosted as a component and/or a subsystem of another component of data storage system 100. For example, in some embodiments, some or all of the functionality of storage controllers 130 may be implemented by software executed on one or more compute resources in at least one of data storage devices 140, fabric network 110, and/or physical interfaces or networking components thereof.

In some embodiments, host systems 102 are coupled to data storage system 100 through a network interface 104 that is part of fabric network 110. In some embodiments, multiple host systems 102.1-102.*n* are coupled to data storage system 100 through fabric network 110, which may include a storage network interface or other interface capable of supporting communications with multiple host systems 102. Fabric network 110 may include a wired and/or wireless network (e.g., public and/or private computer networks in any number and/or configuration) which may be coupled in a suitable way for transferring data. For example, fabric network 110 may include any means of a conventional data communication network such as a local area network (LAN), a wide area network (WAN), a telephone network, such as the public switched telephone network (PSTN), an intranet, the internet, or any other suitable communication network or combination of communication networks.

Fabric network 110 may include or employ one or more interfaces, routers, and physical connections to each component or subcomponent physically and logically connected to fabric network 110. Fabric network 110 may be defined in terms of fabric nodes communicating with one another through fabric network 110 using a fabric network protocol, such as NVMe-oF. In some embodiments, fabric nodes may be organized as system nodes and subsystem nodes, where subsystem nodes include addressable storage resources and system nodes include subsystem management resources. Fabric network 110 may support a data connection to each subsystem fabric node, but typically conveys commands in addition to data, and optionally conveys metadata, error correction information and/or other information in addition to data values to be stored in storage devices 140 and data values read from storage devices 140.

In the embodiment shown, fabric network 110 may include or interface with one or more discovery controllers 106.1-106.*n*. Discovery controllers 106 may have a known network address in fabric network 110 that allows host systems 102 to discover other nodes in fabric network 110 and, more specifically, subsystem nodes corresponding to storage devices 140. For example, discovery controllers 106 may aggregate subsystem address and other node configuration data for storage devices 140 connected to fabric network 110 and exposed for host use. Host systems 102 may send discovery requests to discovery controllers 106 to receive that node address and configuration data, as will be further explained below.

In some embodiments, each storage device 140 includes a device controller, which includes one or more processing units (also sometimes called central processing units (CPUs) or processors or microprocessors or microcontrollers) configured to execute instructions in one or more programs. In some embodiments, the one or more processors are shared by one or more components within, and in some cases, beyond the function of the device controllers. Media devices are coupled to the device controllers through connections that typically convey commands in addition to data, and optionally convey metadata, error correction information and/or other information in addition to data values to be stored in media devices and data values read from media devices. Media devices may include any number (i.e., one or more) of memory devices including, without limitation, non-volatile semiconductor memory devices, such as flash memory device(s).

In some embodiments, media devices in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
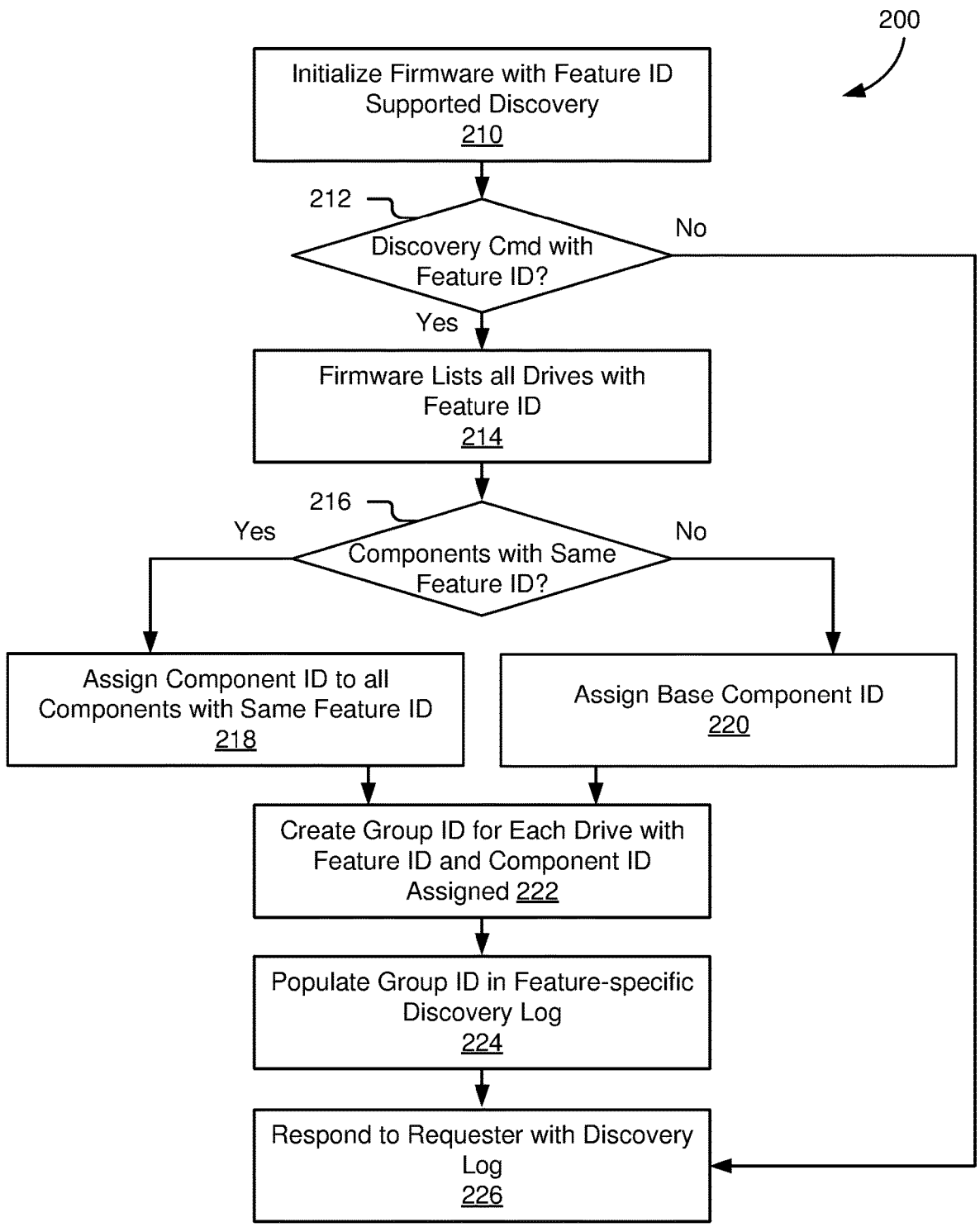
FIG. 2 is an example method for managing storage device discovery, according to aspects of the present disclosure.

FIG. 2 illustrates an example method 200 for managing storage device discovery based on feature identification within a networked storage environment, such as storage system 100 in FIG. 1. The method 200 begins at block 210, where firmware within a storage system is initialized to support discovery based on feature identifiers. This initialization process may configure the storage system to recognize and process discovery commands that include feature identifiers corresponding to features of data storage devices within the storage system. For example, one or more discovery controllers may be initialized with firmware that supports feature identifiers and, more specifically, group identifier tokens, in discovery requests from host systems. The feature identifier may correspond to a specific attribute or capability of the data storage devices, such as capacity, port configuration, or vendor-specific characteristics.

At decision block 212, responsive to receiving a discovery command from a host system, the firmware determines whether or not the discovery command includes a feature identifier. For example, the firmware may parse the incoming discovery commands to determine whether a group identifier token is present in the command parameters. If the discovery command includes a feature identifier method 200 may proceed to block 214. Upon receiving the discovery command with the feature identifier, the firmware lists all drives that possess the feature identified by the feature identifier at block 214. If the discovery command does not include the feature identifier, the discovery command may be processed as normal and method 200 may proceed to block 226.

Decision block 216 queries whether multiple components, such as data storage devices, have the same feature identifier. If the answer is affirmative, block 218 is executed, where a component identifier is assigned to all components sharing the same feature identifier. This component identifier serves to distinguish between different configurations or versions of the feature within the storage system. Alternatively, if the components do not share the same feature identifier, block 220 is executed, where a base component identifier is assigned. The base component identifier may serve as a default or generic identifier for components that do not possess the specific feature identified.

At block 222, a group identifier is created for each drive based on the feature identifier and the component identifier assigned in the previous steps. The group identifier uniquely identifies a set of data storage devices that share a common feature configuration, facilitating targeted discovery and connection by host systems.

The feature-specific discovery log is then populated with the group identifiers and corresponding data storage device entries at block 224. The discovery log serves as a record that maps group identifiers to their corresponding data storage devices, providing a structured overview of the available storage resources and their features, as well as providing discovery log entries for those data storage devices.

The method 200 concludes at block 226, where the storage system responds to the requester, such as a host system, with the discovery log. The discovery log enables the requester to identify and connect to data storage devices within the storage system that meet the desired feature configurations, streamlining the management and utilization of storage resources within the networked storage environment.

Figure 3:
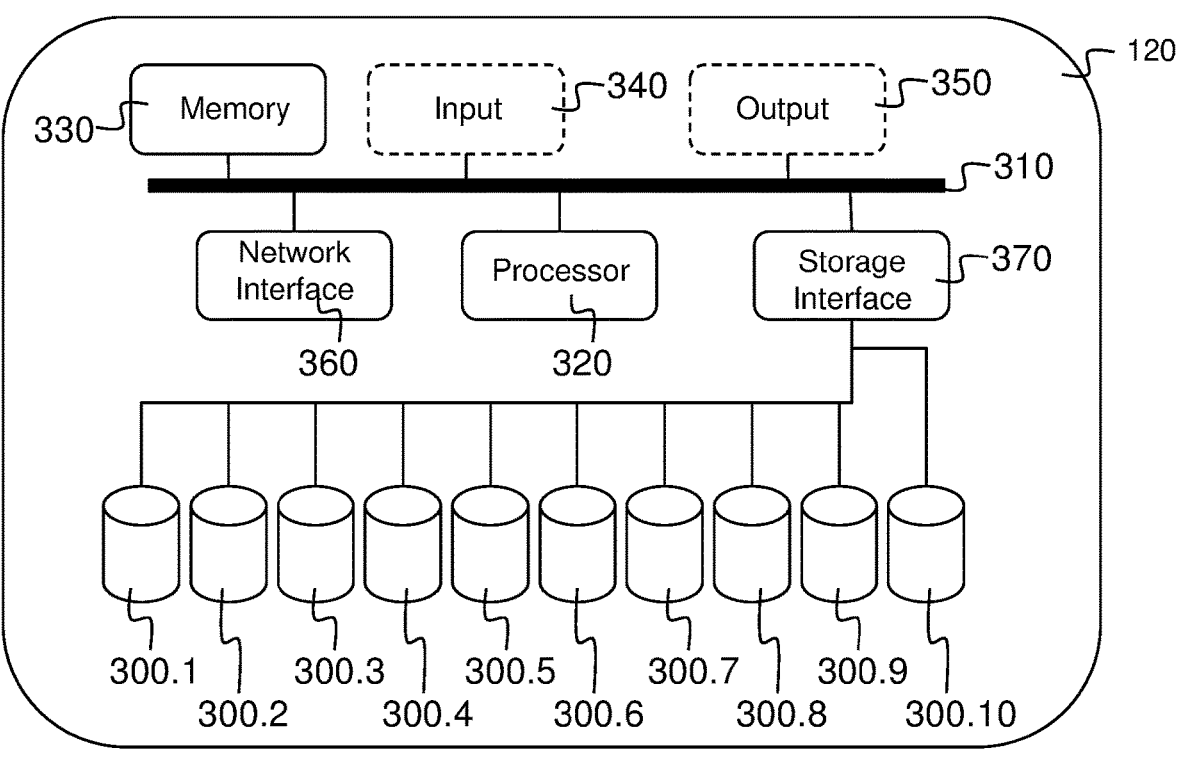
FIG. 3 is a block diagram of an example storage node, according to aspects of the present disclosure.

FIG. 3 shows a schematic representation of one of the storage nodes 120. Storage node 120 may comprise a bus 310, a processor 320, a local memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage interface controller, such as NVMe controllers 130. Bus 310 may include one or more conductors that permit communication among the components of storage node 120. Processor 320 may include any type of conventional processor or microprocessor that interprets and executes instructions. Processor 320 may be embodied in one or more hardware processors and/or processor cores configured to operate alone or in conjunction to execute the operations of storage node 120. Local memory 330 may include one or more random-access memory (RAM) devices or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 120, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 120 to communicate with other devices and/or systems, for example mechanisms for communicating with other storage nodes 120, discovery controllers 106, and/or host systems 102, such as, for example, two 1 gigabit (Gb) Ethernet interfaces. Storage element interface 370 may comprise a storage interface, such as a Serial Advanced Technology Attachment (SATA) interface, a Small Computer System Interface (SCSI), Fibre Channel (FC), PCIe, etc., for connecting bus 310 to one or more storage elements 300, such as one or more storage devices 140, for example, 2 terabyte (TB) SATA-II disk drives or 2 TB NVMe solid state drives (SSDs), and control the reading and writing of data to/from these storage elements 300. As shown in FIG. 3, such a storage node 120 could comprise ten 4 TB NVMe SSDs as storage elements 300.1-300.10 and, in this way, storage node 120 would provide a storage capacity of 40 TB to the storage system 100.

Taking into account FIG. 1 and FIG. 3, the storage system 100 may comprises a plurality of storage elements 300. Storage nodes 120 each comprise a share of these storage elements 300. Each storage nodes 120 could comprise a similar amount of storage elements, but this is, however, not essential. Storage node 120 could for example comprise four, eight, ten, or any other number of storage elements appropriate to interface and form factor constraints. Additionally, storage elements 300 (in the same storage node and/or across different storage nodes) need not have similar configurations or feature sets. For example, a storage node may include data storage devices of a variety of capacities, port configurations, vendors, input/output capabilities, etc. Similarly, the combination of storage devices used in the storage node may change over time as aging or failed devices are replaced with new devices with different configurations. The storage system 100 may be operable to store and retrieve data objects, data blocks, data files, or other data units comprising data, for example, 64 megabytes (MB) of binary data may be retrieved from a namespace in one or more storage elements 300 using an LBA or object identifier for addressing this data unit, for example a universally unique identifier such as a globally unique identifier (GUID).

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces such as for example different revisions of SATA, SCSI, FC, NVMe, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
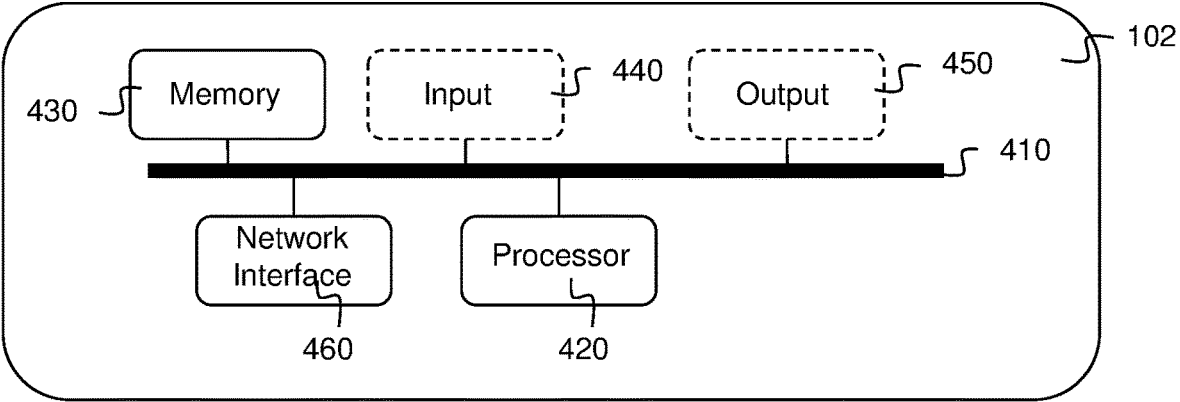
FIG. 4 is a block diagram of an example host system, according to aspects of the present disclosure.

FIG. 4 shows a schematic representation of host systems 102. Host system 102 may comprise a bus 410, a host processor 420, a host memory 430, one or more optional input units 440, one or more optional output units 450, and a communication interface 460. Bus 410 may include one or more conductors that permit communication among the components of controller node 106. Processor 420 may include any type of conventional processor or microprocessor that interprets and executes instructions. Processor 320 may be embodied in one or more hardware processors and/or processor cores configured to operate alone or in conjunction to execute the operations of host system 102. Host memory 430 may include one or more random access memory (RAM) devices or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to said host system 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host system to communicate with other devices and/or systems, for example, mechanisms for communicating with storage nodes 120 or discovery controllers 106 over a fabric network, such as two 10 Gb Ethernet interfaces.

Figures 5A, 5B:
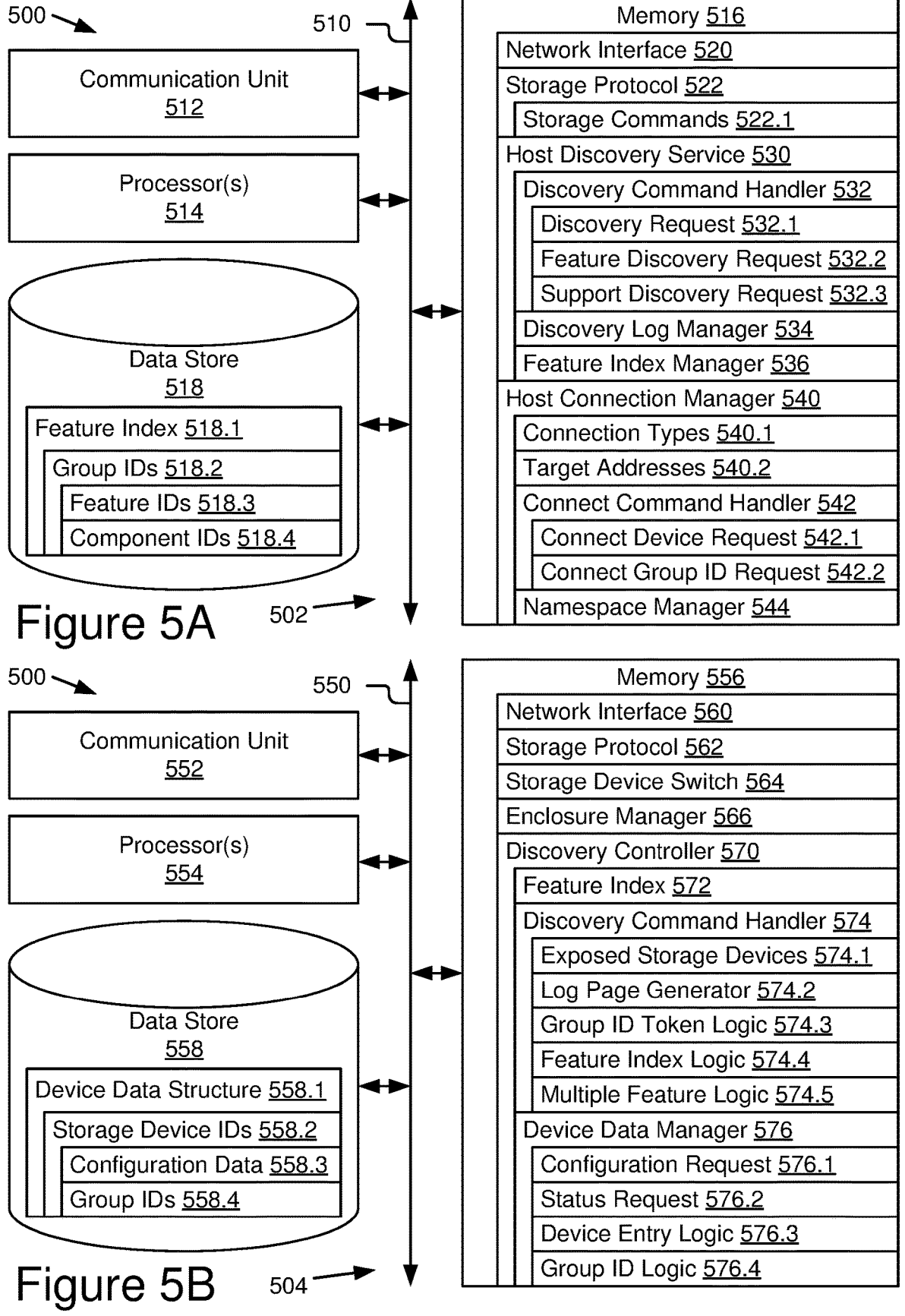
FIG. 5A is an example host system for accessing storage devices in a networked storage system, according to aspects of the present disclosure.
FIG. 5B is an example discovery controller for allowing host discovery of storage devices in a networked storage system, according to aspects of the present disclosure.

FIGS. 5A and 5B schematically show selected modules of a storage system 500 configured in a fabric network with device discovery functions based on feature identifiers modifying generation of discovery logs provided to requesting host systems. Storage system 500 may be configured in host systems and storage nodes with an architecture and/or hardware similar to host systems 102 and/or storage nodes 120. Storage system 500 may incorporate elements, configurations, and methods similar to those shown in FIGS. 1-4. For example, storage system 500 may be configured with the operations of host system 502 in FIG. 5A in a host system similar to host systems 102. Storage system 500 may be configured with the operations of NVMe target system 504 in FIG. 5B in a storage device enclosure similar to storage node 120 and/or a separate discovery controller similar to discovery controllers 106.

Host system 502 may include a bus 510 interconnecting at least one communication unit 512, at least one processor 514, and at least one memory 516. Bus 510 may include one or more conductors that permit communication among the components of host system 502. Communication unit 512 may include any transceiver-like mechanism that enables storage system 500 to communicate with other devices and/or systems. For example, communication unit 512 may include wired or wireless network mechanisms for communicating with other storage system components, such storage nodes and discovery controllers. Processor 514 may include any type of processor or microprocessor that interprets and executes instructions. Processors 514 may be embodied in one or more hardware processors and/or processor cores configured to operate alone or in conjunction to execute the operations of host system 502. Memory 516 may include at least one random access memory (RAM) device or another type of dynamic storage device that stores information and instructions for execution by processor 514 and/or a read only memory (ROM) device or another type of static storage device that stores static information and instructions for use by processor 514 and/or any suitable storage element such as a hard disc or a solid state storage element.

Host system 502 may include or have access to one or more databases and/or specialized data stores, such as host data store 518. Databases may include one or more data structures for storing, retrieving, indexing, searching, filtering, etc. of structured and/or unstructured data elements. In some configurations, data store 518 may include one or more configuration pages, tables, databases or similar data structures for supporting use of feature identifiers in discovering desired sets of data storage devices. Because different storage systems, discovery controllers, and/or storage nodes may support different sets of features and/or may represent them differently in corresponding token values, data store 518 may be configured to store one or more feature indexes 518.1 for the storage nodes or other components it interacts with for discovery data storage devices. For example, feature index 518.1 may include a set of group identifiers 518.2 that may be used go generate group identifier token values for requesting discovery data regarding specific features and configurations of those features. In some configurations, group identifiers 518.2 may include feature identifiers 518.3 corresponding to different storage device features, such as capacity, drive type, ports, etc. and corresponding component identifiers 518.4 that describe the different possible configurations of each feature. For example, group identifiers 518.2 may include a first value or indicator for feature identifier 518.3 and a second value or indicator for component identifier 518.4. Example configurations of group identifiers 518.2 are further described below with regard to FIGS. 6A and 6B.

Host system 502 may include a plurality of modules or subsystems that are stored and/or instantiated in memory 516 for execution by processor 514. For example, memory 516 may include a network interface 520 configured to communicate with other nodes in distributed storage system 100 over a fabric network. Memory 516 may include a storage protocol 522 configured to define storage commands, both data commands and storage management commands, for interacting with data storage devices over the fabric network. Memory 516 may include a host discovery service 530 configured to manage discovery of data storage devices for establishing storage connections. Memory 516 may include a host connection manager 540 configured to manage host storage connections to data storage devices for data read/write and other storage operations.

Network interface 520 may include an interface protocol and/or a set of functions and parameters for communicating with other nodes in a fabric network using communication unit 512. For example, network interface 520 may include a wired or wireless network connection based on a physical, data link, transport, and network layers for establishing communication with other devices or subcomponents in the fabric network. In some configurations, host system 502 may include one or more ethernet ports configured to use ethernet and transport control protocol (TCP) and internet protocol (IP) network and/or remote direct memory access (RDMA) protocols for establishing fabric connections with other systems or subsystems connected to the network.

Storage interface 522 may include an interface protocol or set of functions and parameters for storing, reading, and otherwise managing data requests to an associated distributed storage system and the corresponding metadata data source for mapping file data to persistent storage data elements in one or more logically connected data storage devices. For example, storage interface 522 may include functions for reading, writing, modifying, or otherwise manipulating data objects or data blocks and their respective client or host data and metadata in accordance with the protocols of an object storage system or a block storage system. In some embodiments, storage interface 522 may enable direct memory access and/or access over NVMe protocols to host data units stored in connected data storage devices. In a fabric-based, disaggregated storage system, storage interface 522 may implement NVMe-oF standards for establishing storage communication with data storage devices. Storage interface 522 may define a set of storage commands 522.1 complying with the standards of storage interface 522 for communication with connected data storage devices, as well as storage management commands for intermediate components, such as NVMe targets and discovery controllers. In some configurations, storage protocol 522 may be used to establish host communication with NVMe target system 504 based on a known fabric network address and role as an NVMe node or system.

Host discovery service 530 may include an interface protocol and set of functions, data structures, and parameters for generating and sending discovery requests and receiving and parsing discovery logs received in response. In some embodiments, host discovery service 530 may include a plurality of hardware and/or software modules configured to use processor 514 and memory 516 to handle or manage defined operations of host discovery service 530. For example, host discovery service 530 may include a set of discovery command handler 532 configured to determine available data storage devices for connection from one or more discovery controllers. Host discovery service 530 may include a discovery log manager 534 configured to receive and process discovery logs received from one or more discovery controllers. Host discovery service 530 may include a feature index manager 536 configured to parse and store a feature index for available data storage devices to allow selection of data storage devices based on their feature configurations and corresponding group identifiers.

Discovery command handler 532 may include data structures, functions, and interfaces for generating and sending discovery commands to discovery controllers. For example, discovery command handler 532 may respond to NVMe node connections with one or more discovery controllers by sending one or more discovery commands to acquire discovery logs describing the connection parameters for one or more data storage devices exposed through those discovery controllers. Discovery command handler 532 may be configured with a default discovery request 532.1 configured for discovering all connected data storage devices exposed through the discovery controllers. For example, the NVMe standards define a standard discovery command for requesting all connected data storage devices regardless of their feature sets. Discovery command handler 532 may be configured to wait for a response from the discovery controller that includes one or more discovery log pages that includes a plurality of device entries corresponding to different connected data storage devices and their storage connection parameters. For example, the discovery controller may respond with a discovery log as described with regard to FIG. 9 and having the parameters of discovery log entry 916 without group identifier 938.

Discovery command handler 532 may be configured with a feature discovery request 532.2 that requests device log entries having a specific set of feature configurations using a parameter in the feature discovery request. For example, feature discovery request 532.2 may include a feature indicator parameter, such as a group identifier comprised of at least one feature ID and at least one corresponding component ID. In some configurations, feature discovery request 532.2 may be based on a vendor-specific discovery log page generated based on a group identifier included in a vendor specific parameter in the discovery command. For example, the discovery command syntax may be:

$ nvme discover -t <transport type> -a <ip address> -p <transport port> [-F <feature id>]

Where "$ nvme discover" is the command type. The resulting discovery log response may be formatted similar to discovery log 900 in FIG. 9, including group identifier 938 for each device entry. Feature discovery requests 532.2 may support requesting data storage devices based on a single feature and corresponding group identifier and discovery command handler 532 may use a series of feature discovery requests to identify data storage devices with different features and/or specific combinations of features. In some configurations, feature discovery requests 532.2 may support requesting multiple features or a combination of features in a single request.

Discovery command handler 532 may be configured with a support discovery request 532.3 that requests a log page with log entries corresponding to the different features and configurations supported by the particular set of connected data storage device. For example, the storage system may be configured to support any number of features and configurations and different systems may be configured with different supported features and configurations. Additionally, the mapping of features and configurations to feature identifier values and component identifier values may vary from system to system and host system 502 may be configured to acquire a feature index to provide the supported feature identifier values and component identifier values prior to using feature discovery request 532.2. In some configurations, discovery controllers may support a special log page that provides the feature index for the data storage devices. For example, the feature index may include a master list of all features and configurations that could be supported by the set of data storage devices and/or a filtered feature index that is limited to the set of features actually supported by at least one connected data storage device. In some configurations, a specific log page identifier may be assigned to the feature index and support discovery request 532.3 may be in the form of a specific log page request with that predefined log page identifier. For example, a discovery request for discovery log page 0xC1 may result in a log page comprised of feature log entries providing feature parameters, such as feature identifier, feature name, component names, component identifiers, and corresponding group identifiers. An example discovery log page for the feature index may include:

===Log Entry 0===
Feature ID: 0x3
Feature Name: Ports
Component Name: Single Port
Component ID: 0x01
Group ID: 0x0301
Component Name: Dual Port
Component ID: 0x02
Group ID: 0x0302
===Log Entry 1
Feature ID: 0x2
Feature Name: Device Capacity
Component Name: 840 GB
Component ID: 0x01
Group ID: 0x0201
Component Name: 1.6 TB
Component ID: 0x02
Group ID: 0x0202

The feature index in the log page may include any number of support feature identifiers and any number of corresponding component identifiers for the different possible configurations of that feature.

Discovery log manager 534 may include data structures, functions, and interfaces for receiving and storing log pages in response to discovery requests issued by discovery command handler 532. For example, discovery log manager 534 may parse discovery logs received from the discovery controllers to determine the set of available data storage devices. In some configurations, discovery log manager 534 may store received discovery logs from one or more discovery controllers in a discovery log data structure in volatile or non-volatile memory for use by host connection manager 540 to issue connection requests to target data storage devices. For example, discovery log manager 534 may generate and maintain a current discovery log aggregated from one or more discovery requests and discovery log responses. In some configurations, discovery log manager 534 may include group identifier values received in response to feature discovery requests 532.2 in the current discovery log data structure. In some configurations, discovery log manager 534 may receive different group identifiers for different features for the data storage devices and may aggregate and store group identifiers for each data storage device from one or more feature discovery requests to support selecting data storage devices with specific feature combinations or feature sets.

Feature index manager 538 may include data structures, functions, and interfaces for receiving and storing special log pages corresponding to one or more feature indices in response to support discovery requests 532.3. For example, feature index manager may parse feature index discovery logs received from the discovery controllers to determine the set of features, configurations, and corresponding group identifiers available through that discovery controller. In some configurations, feature index manager 538 may store received feature index discovery logs from one or more discovery controllers in a feature index data structure, such as feature index 518.1.

Host connection manager 540 may include an interface protocol and set of functions, data structures, and parameters for selecting target data storage devices, generating and sending connection requests for target data storage devices, and managing the resulting data storage device connections. Host connection manager may be configured to manage different connection types 540.1, such as TCP/IP connections and RDMA connections, to different data storage devices. Host connection manager 540 may use fabric network target addresses 540.2 for a target subsystem based on the discovery log entries from host discovery service 530. For example, the target subsystem may have a subsystem address, type, transport requirements, port and controller identifiers, and other parameters for connecting to the target data storage device through the target subsystem node. Host connection manager 540 may include logic for evaluating the storage device features and combinations of features identified through host discovery service 530 to select the target storage devices to be connected and used for storage operations. For example, host connection manager 540 may select the NVMe qualified names (NQNs) from the discovery logs for devices having one or more desired feature configurations based on their group identifiers. In some embodiments, host connection manager 540 may include a plurality of hardware and/or software modules configured to use processor 514 and memory 516 to handle or manage defined operations of host connection manager 540. For example, host connection manager 540 may include connect command handler 532 configured to generate host connection requests and handle responses from the target data storage device. Host connection manager 540 may include a namespace manager 544 configured to manage the data storage device connections and corresponding namespaces allocated on those data storage devices for use by host system 502.

Connect command handler 542 may include data structures, functions, and interfaces for generating and sending connection requests to data storage devices. For example, connect command handler 542 may include logic for generating connect commands using NVMe protocols and the addressing and interface parameters in the corresponding discovery log device entries. Host connection manager 540 may select target data storage devices and connection types and pass that information to connect command handler 542. Connect command handler 542 may generate connect device requests 542.1 for connecting to a single device having the desired feature set. A series of connect device requests 542.1 may be used to connect to multiple data storage devices with the same or different feature sets. In some configurations, connect command handler 542 may generate connect group ID requests 542.2. For example, connect group ID requests 542.2 may use one or more group identifiers to connect to all data storage devices having those group identifiers in a single command. An example connect group ID request 542.2 may be in the form of:

$ nvme connect-all -t <transport type> -a <ip address> -q <host> [-F <group id>

Where "$ nvme connect all" is the command type. The NVMe target may verify all of the data storage devices with the selected group identifier value and connect the host system to all of those data storage devices using their NQNs or subsystem name.

Namespace manager 544 may include data structures, functions, and interfaces for allocating or selecting namespaces among connected data storage devices for executing host data storage commands, such as host data read, write, and delete commands. For example, responsive to connecting to one or more data storage devices, namespace manager 544 may use existing namespaces or create new namespaces on those data storage devices and map those namespaces to the application file system used by host applications. In some configurations, namespace manager 544 may maintain a data structure mapping data files, blocks, objects, or other data units to the namespaces in the data storage devices that store those objects. Similarly, namespace capacity, security and data protection features, and other storage parameters may be mapped to specific namespaces and the data units stored there.

Target system 504 may include a bus 550 interconnecting at least one communication unit 552, at least one processor 554, and at least one memory 556. Bus 550 may include one or more conductors that permit communication among the components of target system 504. Communication unit 552 may include any transceiver-like mechanism that enables target system 504 to communicate with other devices and/or systems. For example, communication unit 552 may include wired or wireless network mechanisms for communicating with other storage system components, such host systems and/or data storage devices. Processor 554 may include any type of processor or microprocessor that interprets and executes instructions. Processors 554 may be embodied in one or more hardware processors and/or processor cores configured to operate alone or in conjunction to execute the operations of target system 504. Memory 556 may include at least one random access memory (RAM) device or another type of dynamic storage device that stores information and instructions for execution by processor 554 and/or a read only memory (ROM) device or another type of static storage device that stores static information and instructions for use by processor 554 and/or any suitable storage element such as a hard disc or a solid state storage element.

Target system 504 may include or have access to one or more databases and/or specialized data stores, such as host data store 558. Databases may include one or more data structures for storing, retrieving, indexing, searching, filtering, etc. of structured and/or unstructured data elements. In some configurations, data store 558 may include one or more configuration pages, tables, databases or similar data structures for supporting use of feature identifiers in discovering desired sets of data storage devices. Because different data storage devices may include different sets of features and configurations, data store 558 may be configured to store one or more device data structures 558.1 for the data storage devices exposed through target system 504. For example, device data structure 518.1 may include storage device identifiers 558.2 corresponding to the different storage devices connected to that target system. A JBOF enclosure may include storage device identifiers for each storage device in the set of slots within that enclosure or a separate discovery controller may include storage device identifiers for each storage device across multiple enclosures connected to that discovery controller. Storage device identifiers 558.2 may include one or more unique identifiers assigned to that storage device, such as the device's NQN, device serial number, or a encloser/slot identifier. Device data structure 518.1 may further include configuration data 558.3 describing that data storage device. Configuration data 558.3 may include NVMe interface parameters, such as the data used to populate device entries in discovery logs, and may include additional data describing the data storage device, such as feature configurations for one or more features. Device data structure 518.1 may include group identifiers 558.4 assigned to each data storage device. For example, each storage device identifier 558.2 may have a corresponding set of one or more group identifiers 558.4 describing the feature configurations present for that storage device. Example configurations of group identifiers 518.2 are further described below with regard to FIGS. 6A and 6B.

Target system 504 may include a plurality of modules or subsystems that are stored and/or instantiated in memory 556 for execution by processor 554. For example, memory 556 may include a network interface 560 configured to communicate with other nodes in distributed storage system 100 over a fabric network. Memory 556 may include a storage protocol 562 configured to define storage commands, both data commands and storage management commands, for interacting with host system and data storage devices over the fabric network. If target system 504 is configured in the firmware of a JBOF enclosure or similar storage node, memory 556 may include a storage device switch 564 configured for managing communication to the set of data storage devices in the enclosure and an enclosure manager 566 configured to manage power, cooling, and other administrative features of the enclosure. Memory 556 may include a discovery controller 530 configured to manage discovery of data storage devices by host systems, such as host system 502.

Network interface 560 may include an interface protocol and/or a set of functions and parameters for communicating with other nodes in a fabric network using communication unit 552. For example, network interface 560 may include a wired or wireless network connection based on a physical, data link, transport, and network layers for establishing communication with other devices or subcomponents in the fabric network. In some configurations, target system 502 may include one or more ethernet ports configured to use ethernet and TCP/IP network and/or RDMA protocols for establishing fabric connections with other systems or subsystems connected to the network.

Storage interface 562 may include an interface protocol or set of functions and parameters for storing, reading, and otherwise managing administrative requests for an associated distributed storage system and the management of connections and routing among host systems and data storage devices. In some embodiments, storage interface 562 may enable direct memory access and/or access over NVMe protocols to host data units stored in connected data storage devices through or in conjunction with target system 504. In a fabric-based, disaggregated storage system, storage interface 562 may implement NVMe-oF standards for establishing storage communication between host systems and data storage devices.

Storage device switch 564 may include a set of physical and transport paths between a network interface to the fabric network and the physical interfaces of the data storage devices. For example, each data storage device may be plugged into a slot supporting at least one PCIe port connection. In some configurations, storage device switch 564 may be a PCIe switch supporting a predefined number of lanes for connecting to the PCIe interfaces of the set of data storage devices.

Enclosure manager 566 may include an interface protocol and set of functions, parameters, and data structures for managing control and administrative functions for the enclosure. For example, enclosure manager 566 may be configured as a baseboard management controller (BMC) that manages various power connections, fans, sensors, and other electrical subsystems of the enclosure. For example, enclosure manager 566 may interface with one or more control systems for data storage system 500 to manage power, cooling, and energy states for the enclosure and the data storage devices it contains.

Discovery controller 570 may include an interface protocol and set of functions, data structures, and parameters for receiving and responding to discovery requests by generating and sending discovery logs for the devices exposed through that discovery controller. Discovery controller 570 may also aggregate and store configuration data 558.3 for the data storage devices to support generation of discovery logs. In some embodiments, discovery controller 570 may include a plurality of hardware and/or software modules configured to use processor 554 and memory 556 to handle or manage defined operations of discovery controller 570. For example, discovery controller 570 may include a feature index 572 configured to store the set of features and possible configurations supported by the data storage system. Discovery controller 570 may include a discovery command handler 574 configured to determine available data storage devices for generation of corresponding discovery logs. Discovery controller 570 may include a device data manager 576 configured to receive and store configuration data from the data storage devices.

Feature index 572 may include data structures, functions, and interfaces for maintaining a data structure describing the set of features and corresponding feature configurations supported by storage system 500. For example, feature index 572 may be configured and updated to provide a system or vendor specific list of data storage device features and corresponding configuration options for use in describing the various data storage devices and their capabilities. Feature index 572 may map feature names and configuration names to feature identifier values and component identifier values. Feature index 572 may implement a group identifier scheme, such as one of the example group identifier schemes described below with regard to FIGS. 6A and 6B.

Discovery command handler 574 may include data structures, functions, and interfaces for receiving and responding to discovery commands from host systems. For example, discovery command handler 574 may respond to discovery requests from one or more host systems, such as host system 502. Discovery command handler 574 may be configured to generate discovery logs based on exposed storage devices 574.1, which may include the data storage devices currently connected to the fabric network, identified using storage protocol 562 to discovery controller 570, and configured for host connections. Discovery command handler 532 may include logic to parse received host discovery commands and dynamically generate discovery log pages based on the set of exposed storage devices 574.1. Log page generator 574.2 may generate a requested discovery log page based on exposed storage devices 574.1 and corresponding configuration data 558.3. For example, log page generator 574.2 may generate a discovery log as described with regard to FIG. 9 and having the parameters of discovery log entry 916.

Discovery command handler 574 may be configured to handle feature discovery request 532.2 that requests device log entries having a specific set of feature configurations using a parameter in the feature discovery request. For example, the discovery request may include a feature indicator parameter, such as a group identifier comprised of at least one feature ID and at least one corresponding component ID. Discovery command handler 574 may include group identifier token logic 574.3 configured to determine the group ID token value from discovery command parameter and use the group identifier value to filter for corresponding storage device identifiers in device data structure 558.1. Log page generator 574.2 may then use the filtered list of storage device identifiers and corresponding configuration data to populate device entries in one or more discovery log pages. In some configurations, group identifier values may be included in the device entries in the discovery log pages.

Discovery command handler 574 may be configured to support discovery request 532.3 that requests a log page with log entries corresponding to the different features and configurations supported by the particular set of connected data storage device. For example, discovery command handler may receive support discovery requests to provide feature index 572 or a subset of feature index 572 to the requesting host system. In some configurations, discovery command handler 574 may support a special log page that provides the feature index for the data storage devices. Discovery command handler 574 may include feature index logic 574.4 configured to select parameters of feature index 572 to provide to the host system. For example, the feature index may include a master list of all features and configurations that could be supported by the set of data storage devices and/or a filtered feature index that is limited to the set of features actually supported by at least one connected data storage device and feature index logic 574.4 may parse parameters from the request to determine what log page or set of log pages are provided in response to the request.

Discovery command handler 574 may be configured to support feature discovery requests that specific multiple features and corresponding configurations in the same feature request. For example, the feature parameter of the request may include a token value comprised of an array of values mapped to different feature identifiers and/or corresponding component identifiers. Multiple feature logic 574.5 may include logic for mapping the multiple feature and component identifiers to corresponding group identifiers and/or an aggregate group identifier for the specified set of features. An example configuration of multiple features in a single group identifier is described below with regard to FIG. 6B.

Device data manager 576 may include data structures, functions, and interfaces for requesting, receiving, and/or storing configuration data for the exposed storage devices. For example, device data manager 576 establish a host or administrative connection to each data storage device and query that data storage device for one or more features and corresponding configuration types. For example, device data manager 576 may respond to the connection of each new data storage device to target device 504 by sending configuration request 576.1 to the storage device to request configuration data from a configuration page or similar resource within the data storage device. Interface configuration data may be received by discovery controller 570 in accordance with NVMe protocols for configuring subsystem nodes, stored to configuration data 558.3, then used to generate configuration request 576.1 for device configuration parameters related to storage device type and supported features. In some configurations, device data manager 576 may also maintain status data for the data storage devices based on administrative protocols and status request 576.2. For example, status request 576.2 may receive power mode, operating life, capacity use, error rate, queue depth, and similar operating status data from the data storage devices and update current state data for each device in configuration data 558.3. Status request 576.2 may be based on a periodic trigger (such as a schedule, operating period, etc.) or trigger conditions, such as connection, reconnection, power cycling, error state, etc. Device data manager 576 may include device entry logic 576.3 for organizing configuration data received by device data manager 576 into device data structure 558.1 for future use. For example, device entry logic 576.3 may store configuration data in a field structure mapping to the fields defined by NVMe standards and supplemented with additional fields corresponding to features and configurations. Device data manager 576 may also include group identifier logic 576.4 configured to map feature and corresponding configuration data received from the data storage devices into the feature identifier values, component identifier values, and group identifier values used by discovery command handler 574. In some configurations, configuration data 558.3 and group identifiers 558.4 stored for each data storage device may be used for supporting group connect commands, such as connect group ID request 542.2 For example, a group identifier token value may be used as an index value for identifying all of the storage device identifiers 558.2 with that group identifier value 558.4 and target node 504 may execute connection requests for each identified data storage device in response to a single connect command from host system 502.

Memories 516 and 556 may include additional logic and other resources (not shown) for configuring and maintaining the fabric network and processing data requests, such as modules for generating, queueing, and otherwise managing input/output data requests. Host discovery service 530, host connection manager 540, and discovery controller 570 may include any number of additional data structures, functions, and interfaces for configuring and maintaining the fabric network, including target/subsystem initialization, administrative commands, and other fabric node features.

Figure 6A:
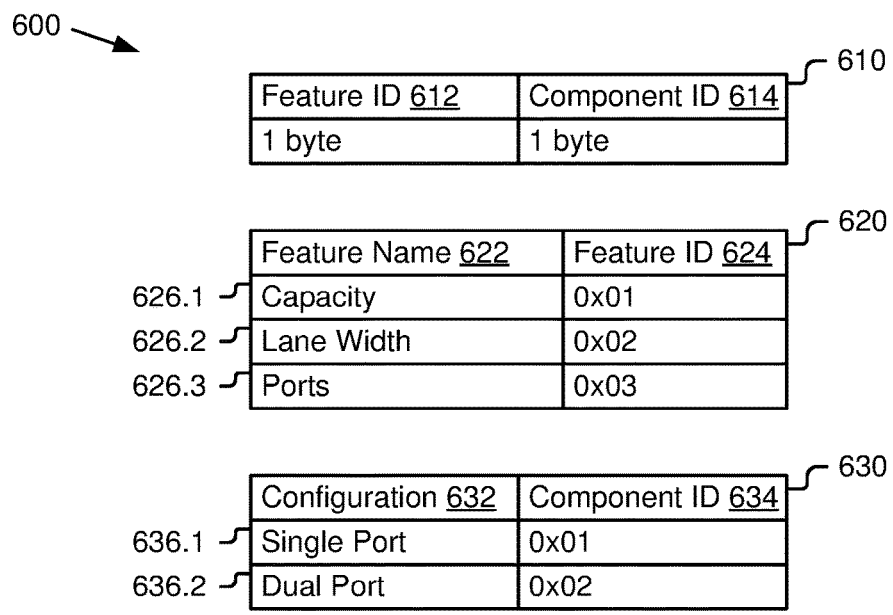
FIG. 6A illustrates an example configuration of group identifiers for storage device discovery, according to aspects of the present disclosure.

Referring now to FIG. 6A, a group identifier format 600 is depicted, which is instrumental in the organization and identification of data storage devices within a networked storage system, such as networked storage system 100. The group identifier format 600 includes a group identifier token 610, which is a composite identifier that uniquely identifies data storage devices based on their features and configurations. The group identifier token 610 is composed of two parts: a feature ID 612 and a component ID 614. The feature ID 612 is a one-byte value that corresponds to a particular feature of the data storage devices. This feature could represent various attributes such as capacity, port configuration, or other vendor-specific characteristics. The component ID 614 is also a one-byte value and is used to differentiate between various configurations or versions of the feature identified by the feature ID 612.

The feature identifier table 620 may be a structured data representation that categorizes and identifies various features of data storage devices within a networked storage system, such as networked storage system 100. This table may be utilized by the discovery controller, such as first discovery controller 106.1, to facilitate the discovery and management of storage devices based on their specific features. Each entry within the feature identifier table 620 includes a feature name 622 and a corresponding feature ID 624. The feature name 622 describes a particular attribute or capability of the data storage devices, such as their capacity, port configuration, or other vendor-specific characteristics. The feature ID 624 is a numerical value, typically a one-byte value, that uniquely identifies the feature described by the feature name 622. For example, the feature identifier table 620 may include entries such as capacity feature entry 626.1, lane width feature entry 626.2, and ports feature entry 626.3. Each of these entries would have an associated feature ID 624 that allows the discovery controller to recognize and differentiate between the features when processing discovery commands from a host system, such as first host 102.1.

The component identifier table 630 may be an organized listing within the networked storage system 100 that associates specific configurations of data storage device features with corresponding component identifier values. This table is instrumental in distinguishing between different configurations or versions of a particular feature identified by the feature identifier table 620. Each entry in the component identifier table 630 comprises a configuration 632, which describes a specific version or variation of a feature, and a component identifier 634, which is a numerical value, typically a one-byte value, that uniquely identifies the configuration 632. The component identifier 634 serves as a differentiator among data storage devices that share a common feature but may have different specifications or capabilities. For instance, the component identifier table 630 may include entries such as a single port entry 636.1 and a dual port entry 636.2, each with a distinct component identifier 634. These entries correspond to the feature of the number of ports available on a data storage device, as identified by the feature identifier table 620. The single port entry 636.1 would have a component identifier 634 that signifies a single-port configuration, while the dual port entry 636.2 would have a component identifier 634 that signifies a dual-port configuration.

Figure 6B:
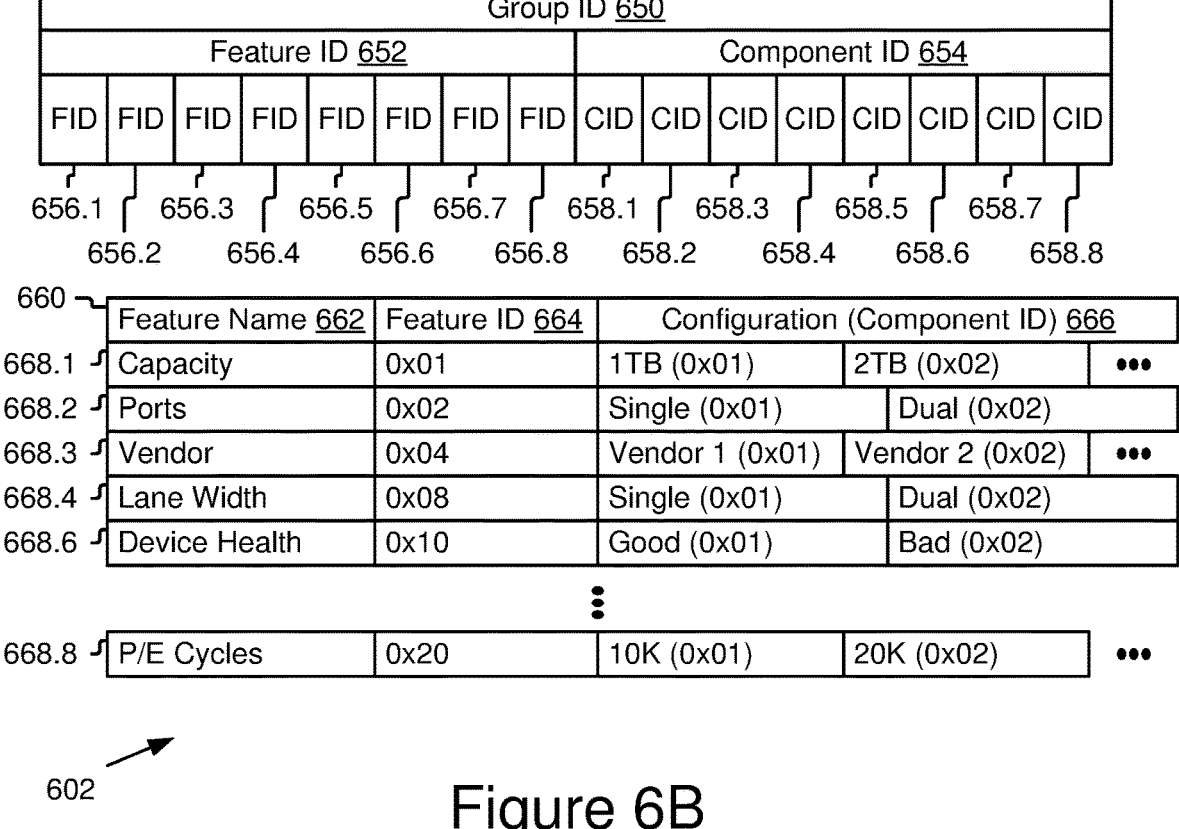
FIG. 6B illustrates an example configuration of multi-feature group identifiers for simultaneously discovering storage devices based on multiple features, according to aspects of the present disclosure.

FIG. 6B illustrates the multiple feature group identifier format 602, which is designed to enable the simultaneous discovery of storage devices based on multiple features within a networked storage system, such as networked storage system 100. This format is particularly useful for host systems, such as first host 102.1, that require storage devices with a specific set of features and configurations. At the core of the multiple feature group identifier format 602 is the multiple feature group identifier 650, which organizes the feature IDs and component IDs into a structured format. The feature ID byte 652 and the component ID byte 654 are combined to form a two-byte token value that uniquely identifies a group of storage devices sharing the same set of features and configurations. The feature ID byte 652 is further divided into individual bits, such as feature ID bits 656.1-656.8. Each bit represents a binary value that corresponds to a specific feature identified in the feature identifier table 620. Similarly, the component ID byte 654 is divided into bits, such as component ID bits 658.1-658.8, with each bit representing a binary value that corresponds to a specific configuration within the component identifier table 630.

The feature table 660 defines the values for the multiple feature group identifier format 602, listing feature names 662 and feature IDs 664. This table includes various entries, such as capacity feature entry 668.1, ports feature entry 668.2, vendor feature entry 668.3, lane width feature entry 668.4, device health feature entry 668.6, and program/erase (P/E) cycles feature entry 668.8. Each entry in the feature table 660 is associated with a set of configurations and corresponding component IDs 666, which detail the various configurations available for each feature and their corresponding component IDs. The number of configurations and corresponding feature IDs supported for each feature may vary from feature to feature. For example, capacity feature entry 668.1 may describe more than two different capacity identifier values to support a range of different capacities, while port feature entry 668.2 may describe the only two port configurations included in the storage system, single or dual port drives.

The multiple feature group identifier format 602 enables the discovery controller, such as first discovery controller 106.1, to generate discovery logs that include detailed entries for storage devices based on their feature sets. More specifically, a single discovery command using a multiple feature group identifier may receive device entries for the data storage devices that have the desired set of feature configurations, rather than requiring discovery commands for each feature and cross-referencing the resulting device entries to find the desired feature set.

As shown in FIG. 7, storage system 500 may be operated according to an example method for device discovery management, i.e. according to method 700 illustrated by blocks 710-722 in FIG. 7.

The method 700 begins at block 710, where group identifier tokens are determined for each data storage device within the storage system. These group identifier tokens are composite identifiers that uniquely identify data storage devices based on their features and configurations.

At block 712, a discovery command that includes a group identifier token is received from a host system, such as host system 502. The discovery command may be received by a discovery controller, such as the discovery controller of target system 504, to request information about data storage devices that match the group identifier token included in the command.

Proceeding to block 714, the received group identifier token is compared to device group identifier tokens associated with each data storage device in communication with a controller circuit, such as the discovery controller of target system 504. This comparison is performed by the discovery controller to identify data storage devices that have a device group identifier token corresponding to the received group identifier token.

At block 716, at least one data storage device is selected based on the comparison. The selected data storage device or devices have group identifier tokens that match the received group identifier token, indicating that they share a common set of features and configurations desired by the host system.

Block 718 involves determining or generating device entries for a discovery log based on the group identifier token. These device entries correspond to the selected data storage devices and include information that allows a host system to establish communication with the selected devices.

The method 700 continues with block 720, where a discovery log is determined or generated based on the device entries. The discovery log comprises at least one device entry corresponding to the selected at least one data storage device. The discovery log provides a structured overview of the available storage resources and their features, as well as providing subsystem connection information for those data storage devices to the host system.

The process concludes with sending or returning the discovery log to the host system at block 722. The discovery controller may send the discovery log generated at block 720 to the requesting host system. The discovery log enables the host system to identify and connect to data storage devices within the storage system that meet the desired feature configurations, streamlining the management and utilization of storage resources within the networked storage environment.

As shown in FIG. 8, storage system 500 may be operated according to an example method for managing storage device features for discovery, i.e. according to method 800 illustrated by blocks 810-834 in FIG. 8.

The method 800 begins at block 810, where supported features of data storage devices are determined. The discovery controller may identify the various capabilities and attributes of the storage devices that are available within the storage system, such as capacity, port configuration, and vendor-specific characteristics.

At block 812, the method includes determining supported configurations for each identified feature. The discovery controller may identify the different variations or specifications that each feature may have across different storage devices. For example, the configuration for a feature such as port configuration may include single port or dual port options.

Proceeding to block 814, feature identifier values are assigned to the identified features. These feature identifier values serve as numerical representations that uniquely identify each feature. The discovery controller may assign these values based on a preconfigured set of values and/or user configured value assignments.

At block 816, component identifier values are assigned to the configurations associated with each feature. Similar to feature identifier values, component identifier values are numerical representations that uniquely identify each configuration of a feature. The discovery controller may assign these values based on a preconfigured set of values and/or user configured value assignments.

The method 800 continues with block 818, where a master feature index is stored. The discovery controller may store a master feature index that is a data structure or a database that records the feature identifier values, component identifier values, and their corresponding features and configurations. The feature index effectively maps features and configurations to group identifier token values comprised of feature plus component identifiers. In some configurations, the master feature index may be defined external to the discovery controller, such as on a administrative or management system, and downloaded to a configuration page or other datastore in the discovery controller.

At block 820, exposed storage devices are determined. This step involves identifying which storage devices are available for discovery and connection by host systems. The discovery controller may determine the exposed storage devices based on the initialization of subsystem nodes, storage devices' operational status, network connectivity, and other relevant criteria.

Block 822 includes querying storage devices for configuration data. The discovery controller may send requests to the storage devices to retrieve information about their current configurations, which may include data such as capacity, port configuration, and other feature-related information.

At block 824, a set of features present in the storage devices is determined. The discovery controller may analyze the configuration data retrieved from the storage devices to identify the features that are available across the storage system.

Block 826 involves determining the feature configuration for each storage device. The discovery controller may map the retrieved configuration data for each data storage device to the corresponding features and configurations as defined in the master feature index.

Proceeding to block 828, device group identifier token value(s) for each storage device are determined. The device group identifier token values are composite identifiers that uniquely identify storage devices based on their features and configurations. The discovery controller may identify and store group identifier token values for each data storage device based on their feature configurations.

At block 830, device entries for each storage device are stored. These device entries may include information such as subsystem names and addresses, feature configurations, and group identifier token values. The discovery controller may store the device entries to facilitates the creation of discovery logs that host systems can use to identify and connect to storage devices.

Block 832 includes determining a group identifier index with each group identifier token value for a storage device. The group identifier index may be a data structure that maps group identifier token values for each feature configuration available among the data storage devices. The discovery controller may store the group identifier index as a filtered version of the master feature index.

The method 800 concludes with block 834, where the group identifier index is sent or returned to the host system in the discovery log. The discovery controller may send the group identifier index in response to a special discovery command from the host system to provide a feature index that the host system can use for requesting feature-specific discovery logs.

FIG. 9 shows an example discovery log 900 for a distributed storage system, similar to distributed storage systems 100 and 500 and their components, as described in FIGS. 1-5. Discovery log 900 may be an instance of a general discovery log that may be used to generate log pages, including feature-specific discovery log pages. Discovery log 900 may be used to generate a discovery log page 910 for a specific host system. For example, based on host name or a similar unique host identifier, discovery log 900 may be filtered for discovery log entries that contain host mapping information corresponding to the host name. Discovery log page 910 may be specific to an identified host and responsive to a discovery request from that host system. If that discovery request includes a group identifier token, the resulting discovery log page 910 may be a feature-specific discovery log page for that host and desired feature configuration.

In some embodiments, discovery log page 910 may include a plurality of data fields that may be encapsulated in a message container for delivery to the requesting host system. For example, discovery log page 910 may include a generation counter value 912, a number of records value 914, and a number of discovery log entries 916 corresponding to the number of records value 914. Generation counter value 912 may correspond to the most recent or highest generation counter value for the updated discovery log 900. Number of records 914 may correspond to the number of discovery log entries in discovery log 900 that have host mapping information indicating the requesting host system.

In some embodiments, discovery log entries 916 may include a plurality of data fields with a predetermined format for providing subsystem address and routing information in accordance with the fabric protocols being used. For example, discovery log entries 916 may include a subsystem type 920, a transport requirements value 922, a port identifier 924, a controller identifier 926, a maximum queue size 928, a transport service identifier 930, a subsystem name 932, a subsystem address 934, and a subsystem address type 936. Discovery log entries 917 may further include a group identifier value for that data storage device, where the discovery request included a group identifier token. These fields are provided as examples only and other configurations of subsystem fabric node address, routing, and communication parameters are possible. Any configuration of fabric subsystem address and associated parameters that enable a host system to establish a connection with the fabric subsystem node (e.g., successfully execute a connect command) may be used. In the example shown, discovery log entry 916 in discovery log page 910 does not include specific host mapping information. Because discovery log page 910 is generated for a specific requesting host, discovery log entries 916 are already filtered for relevant host mapping and no host system identifier needs to be included in discovery log page 910 or discovery log entries 916.

As shown in FIG. 10, storage system 500 may be operated according to an example method for discovering and managing storage device connections by a host system, i.e. according to method 1000 illustrated by blocks 1010-1032 in FIG. 10.

The method 1000 begins at block 1010, where a host system may be configured to send a supported feature discovery request to a discovery controller within the networked storage system. This request may be designed to retrieve a group identifier index using a discovery log, which contains information about the features supported by the storage devices connected to the network.

At block 1012, the host system receives the group identifier index in a discovery log from the discovery controller. At block 1014, the host system may be configured to store a feature index based on the group identifier index. The feature index may include a list of features and corresponding group identifiers for each feature supported by the storage devices within the networked storage system.

Proceeding to block 1016, the host system may be configured to determine a desired device feature. For example, the host system may support particular applications having capacity, input/output speed, security, data protection, or quality of service standards that are best supported by specific data storage device configurations and the host system may select the desired feature or features based in the feature index.

At block 1018, the host system may be configured to determine a desired feature configuration. The host system may select among the possible configurations for the feature (or features) selected at block 1016.

Block 1020 involves the host system determining the corresponding group identifier token value for the desired device feature configuration. The group identifier token value may be a composite identifier that uniquely identifies a group of storage devices sharing the same feature configuration. The host system may identify the group identifier token value for the desired configuration from the feature index.

At block 1022, the host system may be configured to append the determined group identifier token value to a discovery command. The host system may send this feature-based discovery command to the discovery controller to request information about storage devices that match the group identifier token included in the command.

Block 1024 includes the host system sending the discovery command to the discovery controller. The discovery controller may be configured to process the command and return a feature-specific discovery log to the host system.

Proceeding to block 1026, the host system may be configured to receive the feature-specific discovery log from the discovery controller. The discovery log may comprise at least one device entry corresponding to the data storage devices that matches the group identifier token value.

At block 1028, the host system may be configured to send a connect all command to the target system. This command may include the group identifier token value and instruct the discovery controller to connect the host system to each data storage device that has a device token value corresponding to the received group identifier token value.

Block 1028 involves the host system establishing a connection to each storage device that matches the group identifier token value. This step may be facilitated by the discovery controller and/or target device, which processes the connect all command and establishes the connections on behalf of the host system.

The method 1000 concludes with block 1032, where the host system may be configured to send storage commands to the connected storage devices. These commands may be used to perform data storage and retrieval operations using the connected data storage devices and namespaces defined therein.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:

a controller circuit comprising:

at least one memory; and at least one processor configured to, alone or in combination, execute instructions in the at least one memory to:

determine, for a plurality of data storage devices in communication with the controller circuit:

a plurality of feature identifier values corresponding to a plurality of features of the plurality of data storage devices;

a plurality of component identifier values corresponding to different configurations for each feature identifier value of the plurality of feature identifier values for the plurality of data storage devices; and a plurality of token values based on unique combinations of a feature identifier value and a component identifier value;

determine, for each data storage device of the plurality of data storage devices, a corresponding set of device token values for the features of that data storage device;

determine a set of token values from the plurality of token values for a set of features and corresponding sets of configurations present in the plurality of data storage devices;

receive, from a host system, a request for the set of features and corresponding sets of configurations present in the plurality of data storage devices;

return, to the host system, a first discovery log comprising the set of token values;

receive, from the host system, a discovery command, wherein the discovery command comprises a host token value comprised of at least one token value selected from the set of token values;

compare the received host token value to the corresponding set of device token values for each data storage device of the plurality of data storage devices;

select at least one data storage device that has the device token value that corresponds to the received host token value;

determine a second discovery log comprising at least one device entry corresponding to the selected at least one data storage device; and return, to the host system, the second discovery log.

2. The system of claim 1, wherein:

the host system is configured to connect to a target data storage device of the selected at least one data storage device based on a set of connection parameters defined by a connection protocol and included in the corresponding at least one device entry in the second discovery log; and the device token values correspond to a plurality of features that are not used by the connection protocol to establish communication with the target data storage device.

3. The system of claim 2, wherein:

the received host token value further comprises:

a plurality of target feature identifier values selected from the plurality of feature identifier values; and at least one target component identifier value selected from the plurality of component identifier values corresponding to each target feature identifier value of the plurality of target feature identifier values; and the received host token value corresponds to a selected set of feature configurations for at least one data storage device in the plurality of data storage devices.

4. The system of claim 2, wherein:

the received host token value is a two-byte value;

a first byte of the two-byte value comprises the at least one feature identifier value; and a second byte of the two-byte value comprises the at least one component identifier value.

5. The system of claim 1, wherein the at least one processor is further configured to, alone or in combination, execute instructions in the at least one memory to:

query each data storage device of the plurality of data storage devices for configuration data corresponding to at least one feature for that data storage device;

determine, based on the configuration data for the plurality of data storage devices, the set of features present in the plurality of data storage devices;

assign, based on the set of features, the plurality of feature identifier values;

determine, based on the configuration data for the plurality of data storage devices, the sets of configurations present in the plurality of data storage devices for the set of features;

assign, based on the sets of configurations, the plurality of component identifier values;

determine, for each data storage device of the plurality of data storage devices and for each feature in the set of features, a corresponding configuration; and determine, based on at least one feature in the set of features and the corresponding configuration for that data storage device, at least one device token value for each data storage device of the plurality of data storage devices.

6. The system of claim 5, wherein the at least one processor is further configured to, alone or in combination, execute instructions in the at least one memory to store, in a device configuration data structure in a non-volatile memory, at least one device token value for each combination of each data storage device of the plurality of data storage devices and each feature in the set of features.

7. The system of claim 5, wherein:

the at least one processor is further configured to, alone or in combination, execute instructions in the at least one memory to:

determine a plurality of data storage device sets from the plurality of data storage devices corresponding to different device token values;

determine a group identifier value for each data storage device set; and determine a group identifier index of the group identifier values and corresponding device token values; and the first discovery log comprises the group identifier index.

8. The system of claim 1, further comprising:

the host system, configured for network communication with the controller circuit, comprising:

at least one host memory; and at least one host processor configured to, alone or in combination, execute instructions in the at least one host memory to:

determine a desired device feature configuration;

determine, based on the first discovery log, the host token value corresponding to the desired device feature configuration;

append the host token value to the discovery command; and send the discovery command to the controller circuit.

9. The system of claim 8, wherein:

the at least one device entry in the second discovery log comprises a plurality of device entries for a plurality of selected data storage devices;

the at least one host processor is further configured to, alone or in combination, execute instructions in the at least one host memory to:

receive, from the controller circuit, the second discovery log;

send, to the controller circuit, a connect all command comprising the host token value; and connect the host system to each data storage device of the plurality of selected data storage devices; and the at least one processor is further configured to, alone or in combination, execute instructions in the at least one memory to execute connection commands, responsive to the connect all command, for the plurality of selected data storage devices.

10. The system of claim 1, further comprising:

an enclosure comprising:

a network interface configured for connection to a network fabric;

the plurality of data storage devices; and the controller circuit.

11. A computer-implemented method, comprising:

determining, for a plurality of data storage devices in communication with a target system:

a plurality of feature identifier values corresponding to a plurality of features of the plurality of data storage devices;

a plurality of component identifier values corresponding to different configurations for each feature identifier value of the plurality of feature identifier values for the plurality of data storage devices; and a plurality of token values based on unique combinations of a feature identifier value and a component identifier value;

determining, for each data storage device of the plurality of data storage devices, a corresponding set of device token values for the features of that data storage device;

determining a set of token values from the plurality of token values for a set of features and corresponding sets of configurations present in the plurality of data storage devices;

receiving, from a host system, a request for the set of features and corresponding sets of configurations present in the plurality of data storage devices;

returning, to the host system, a first discovery log comprising the set of token values;

receiving, from the host system, a discovery command, wherein the discovery command comprises a host token value comprised of at least one token value selected from the set of token values;

comparing the received host token value to the corresponding set of device token values for each data storage device of a plurality of data storage devices;

selecting at least one data storage device that has the device token value that corresponds to the received host token value;

determining a second discovery log comprising at least one device entry corresponding to the selected at least one data storage device; and returning, to the host system, the second discovery log.

12. The computer-implemented method of claim 11, wherein:

the host system is configured to connect to a target data storage device of the selected at least one data storage device based on a set of connection parameters defined by a connection protocol and included in the corresponding at least one device entry in the second discovery log; and the device token values correspond to a plurality of features that are not used by the connection protocol to establish communication with the target data storage device.

13. The computer-implemented method of claim 12, wherein:

the received host token value further comprises:

a plurality of target feature identifier values selected from the plurality of feature identifier values; and at least one target component identifier value selected from the plurality of component identifier values corresponding to each target feature identifier value of the plurality of target feature identifier values; and the received host token value corresponds to a selected set of feature configurations for at least one data storage device in the plurality of data storage devices.

14. The computer-implemented method of claim 12, wherein:

the received host token value is a two-byte value;

a first byte of the two-byte value comprises the at least one feature identifier value; and a second byte of the two-byte value comprises the at least one component identifier value.

15. The computer-implemented method of claim 11, further comprising:

querying each data storage device of the plurality of data storage devices for configuration data corresponding to at least one feature for that data storage device;

determining, based on the configuration data for the plurality of data storage devices, the set of features present in the plurality of data storage devices;

assigning, based on the set of features, the plurality of feature identifier values;

determining, based on the configuration data for the plurality of data storage devices, the sets of configurations present in the plurality of data storage devices for the set of features;

assigning, based on the sets of configurations, the plurality of component identifier values;

determining, for each data storage device of the plurality of data storage devices and for each feature in the set of features, a corresponding configuration; and determining, based on at least one feature in the set of features and the corresponding configuration for that data storage device, at least one device token value for each data storage device of the plurality of data storage devices.

16. The computer-implemented method of claim 15, further comprising:

storing, in a device configuration data structure in a non-volatile memory, at least one device token value for each combination of each data storage device of the plurality of data storage devices and each feature in the set of features.

17. The computer-implemented method of claim 15, further comprising:

determining a plurality of data storage device sets from the plurality of data storage devices corresponding to different device token values;

determining a group identifier value for each data storage device set; and determining a group identifier index of the group identifier values and corresponding device token values, wherein the first discovery log comprises the group identifier index.

18. The computer-implemented method of claim 11, further comprising:

determining, by the host system, a desired device feature configuration;

determining, by the host system and based on the first discovery log, the host token value corresponding to the desired device feature configuration;

appending, by the host system, the host token value to the discovery command; and sending, by the host system, the discovery command to the target system.

19. The computer-implemented method of claim 11, further comprising:

receiving, by the host system, the second discovery log;

sending, from the host system and to the target system for the plurality of data storage devices, a connect all command comprising the host token value; and connecting, by the target system and responsive to the connect all command, the host system to each data storage device of the plurality of data storage devices having the device token value matching the host token value.

20. A storage system, comprising:

a plurality of data storage devices exposed to a host system over a network fabric;

at least one memory;

at least one processor;

means for determining, for the plurality of data storage devices:

a plurality of feature identifier values corresponding to a plurality of features of the plurality of data storage devices;

a plurality of component identifier values corresponding to different configurations for each feature identifier value of the plurality of feature identifier values for the plurality of data storage devices; and a plurality of token values based on unique combinations of a feature identifier value and a component identifier value;

means for determining, for each data storage device of the plurality of data storage devices, a corresponding set of device token values for the features of that data storage device;

means for determining a set of token values from the plurality of token values for a set of features and corresponding sets of configurations present in the plurality of data storage devices;

means for receiving, from the host system, a request for the set of features and corresponding sets of configurations present in the plurality of data storage devices;

means for returning, to the host system, a first discovery log comprising the set of token values;

means for receiving, from the host system, a discovery command, wherein the discovery command comprises a host token value comprised of at least one token value selected from the set of token values;

means for comparing the received host token value to the corresponding set of device token values for each data storage device of the plurality of data storage devices;

means for selecting at least one data storage device that has the device token value that corresponds to the received host token value;

means for determining a second discovery log comprising at least one device entry corresponding to the selected at least one data storage device; and means for returning, to the host system, the second discovery log.

* * * * *